United States Patent
Hirohata

(10) Patent No.: US 6,771,243 B2
(45) Date of Patent: Aug. 3, 2004

(54) DISPLAY DEVICE AND METHOD FOR DRIVING THE SAME

(75) Inventor: Shigeki Hirohata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 258 days.

(21) Appl. No.: 10/051,300

(22) Filed: Jan. 22, 2002

(65) Prior Publication Data
US 2002/0097252 A1 Jul. 25, 2002

(30) Foreign Application Priority Data
Jan. 22, 2001 (JP) ........................................ 2001-012752

(51) Int. Cl.[7] ................................................ G09G 3/36
(52) U.S. Cl. ............................ 345/89; 345/99; 345/690
(58) Field of Search ........................... 345/63, 211, 77, 345/89, 102, 92, 531, 540, 536, 559, 560, 589, 100; 348/673, 678, 687

(56) References Cited

U.S. PATENT DOCUMENTS 6,392,620 B1 * 5/2002 Mizutani et al. .............. 345/88
6,473,077 B1 * 10/2002 Takenaka et al. .......... 345/209

OTHER PUBLICATIONS

Nose et al. Pub. No.: U.S. 2001/0003448 A1.*
Ohara et al. Pub. No. : 2002/0101432 A1.*

* cited by examiner

Primary Examiner—Regina Liang
Assistant Examiner—Jennifer T. Nguyen
(74) Attorney, Agent, or Firm—McDermott Will & Emery LLP

(57) ABSTRACT

To provide a display device and a method for driving the same with which image degradation can be reduced that would occur in producing animated images on the display device. Values of luminance are obtained for successive frames. When a difference between them is equal to or larger than a threshold value, a display signal having a black period is generated. When a luminance of a previous frame is higher than a luminance of a subsequent frame, a display signal having a black period provided after a video display period is generated. On the other hand, when a luminance of a previous frame is equal to or lower than a luminance of a subsequent frame, a display signal having a black period provided before a video display period is generated.

24 Claims, 17 Drawing Sheets

| GRAY SCALE | LUMINANCE |
|---|---|
| 225 | 376.39 |
| 226 | 380.08 |
| 227 | 383.79 |
| 228 | 387.52 |
| 229 | 391.27 |
| 230 | 395.04 |
| 231 | 398.83 |
| 232 | 402.64 |
| 233 | 406.47 |
| 234 | 410.31 |
| 235 | 414.18 |
| 236 | 418.07 |
| 237 | 421.98 |
| 238 | 425.90 |
| 239 | 429.85 |
| 240 | 433.82 |
| 241 | 437.80 |
| 242 | 441.81 |
| 243 | 445.84 |
| 244 | 449.88 |
| 245 | 453.95 |
| 246 | 458.04 |
| 247 | 462.14 |
| 248 | 466.27 |
| 249 | 470.41 |

FIG. 5

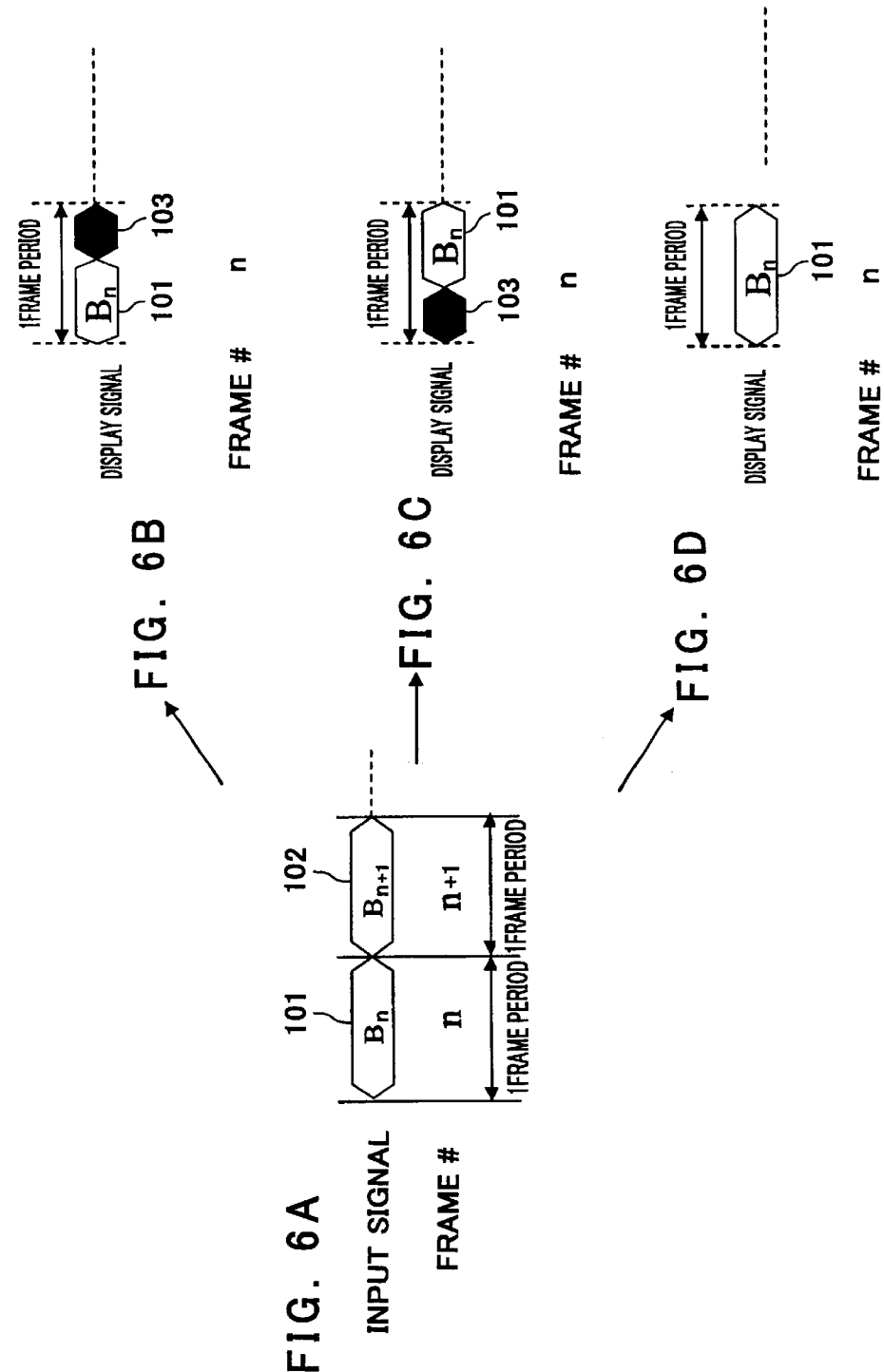

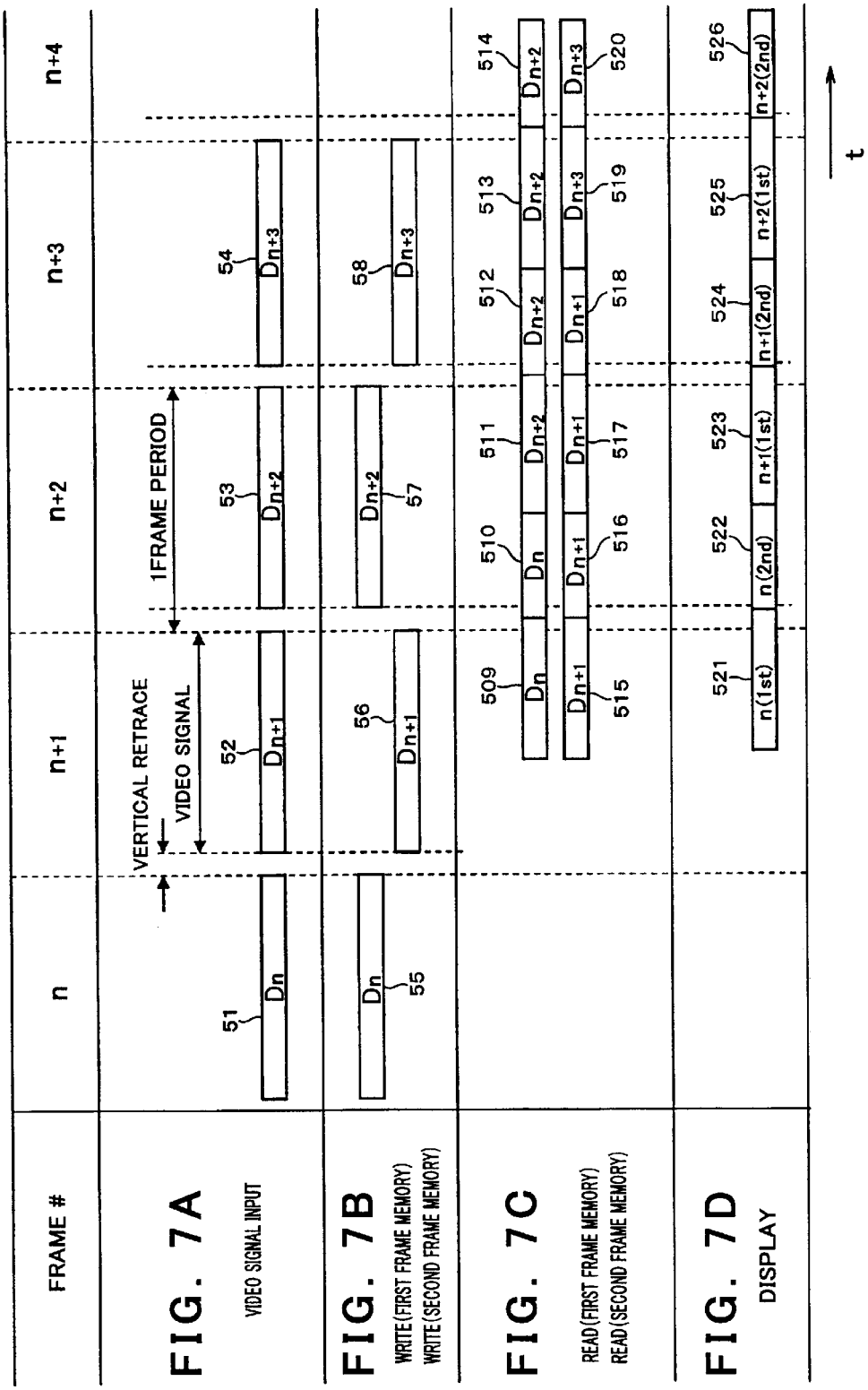

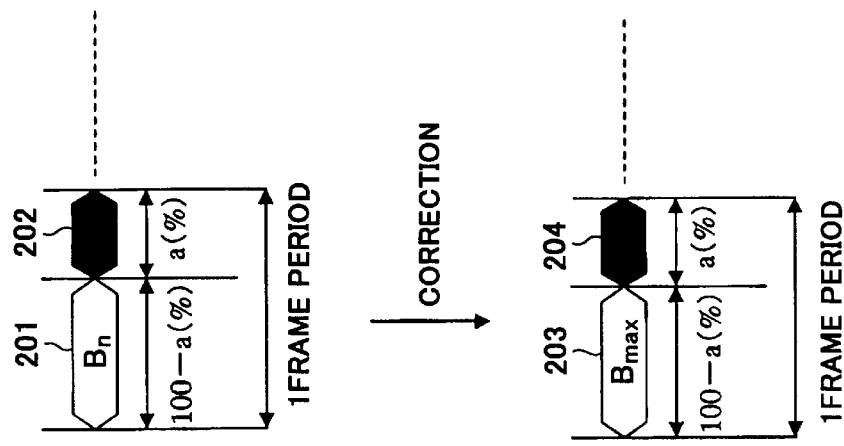
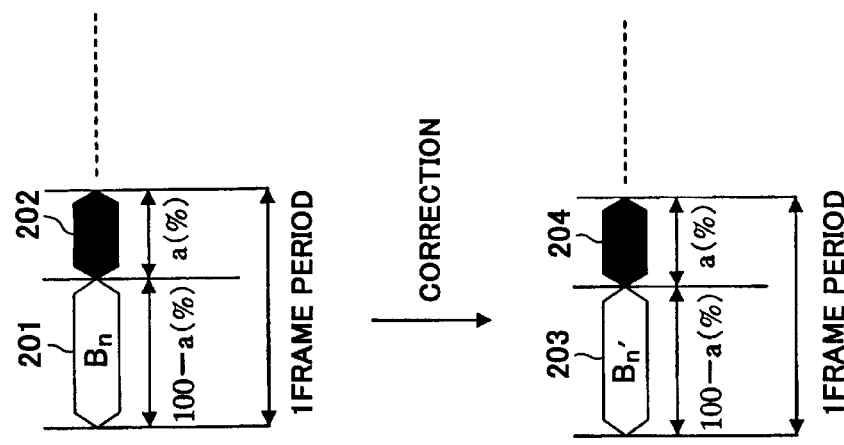

DISPLAY DEVICE AND METHOD FOR DRIVING THE SAME

BACKGROUND OF THE INVENTION

1. Field of the Invention

The present invention relates to a video display device. More particularly, the present invention relates to a display device and a method for driving the same with which image degradation can be reduced that would occur in producing animated images on the display device.

2. Description of the Related Art

Video display devices may generally be categorized as the "hold" type that allows continuous display of a same video image for a single frame period, or the "impulse" type that allows the video images to be displayed momentarily within a single frame period. Examples of the hold display devices include active matrix liquid crystal displays and organic electroluminescence devices. Examples of the impulse display devices include cathode-ray tubes.

FIGS. 14A and 14B are graphical representations of luminance profiles for a given pixel of the hold and impulse display devices, respectively, plotted against a frame period. As shown in FIG. 14A, the hold display device keeps a constant luminance level over each of the individual frame periods. On the other hand, as shown in FIG. 14B, a peak luminance appears at the beginning of each frame period and the luminance drops down suddenly in the impulse display device.

As apparent from the above, the hold and impulse display devices have different display characteristics. The impulse display devices are said to be superior to the hold display devices in terms of showing animated images. This is described below.

FIGS. 15A and 15B are explanation views showing display characteristics of a hold display device in conjunction with the case where white patterns travel on a black background, in which FIG. 15A shows the displacement of the pattern while FIG. 15B shows a luminance distribution thereof. In FIG. 15A, the ordinate stands for the time; the abscissa stands for the horizontal positions on the display screen; Pn (n is a natural number) represents pixels; and W represents a white pattern of five-pixel wide in the horizontal direction.

With the pattern W moved horizontally by one pixel per a given period of time, a viewer's eyes follows the pattern W along a line period (from the broken lines V1 to V4) connecting the edges of the pattern W due to a large difference in luminance between the adjacent pixels at each edge of the pattern W.

In FIG. 15A, the broken lines V1 and V2 correspond to a displacement of the viewer's eyes gazing at the pixel having the smallest value n of the pixels Pn that make up the pattern W. More specifically, the broken lines V1 and V2 correspond to the displacement of the viewer's eyes at the end and beginning of a given frame period T, respectively, for the pixel in question.

The broken lines V3 and V4 correspond to a displacement of the viewer's eyes gazing at the pixel having the largest value n of the pixels Pn that make up the pattern W. More specifically, the broken lines V3 and V4 correspond to the displacement of the viewer's eyes at the end and beginning of a given frame period T, respectively, for the pixel in question.

Thus, the viewer's eyes gazing at the pattern W moves along the path from the broken line V1 to the broken line V4.

However, the video appears as blurred at the regions between the broken lines V1 and V2 as well as between the broken lines V3 and V4 due to the inherent display characteristic of the hold display device that shows the same video image for one frame period as described above with reference to FIG. 14A. The cause of this blurring is described more in detail with reference to FIG. 15B.

In FIG. 15B, portions of the black background are seen in the region left from the broken line V1 and the region right from the broken line V4, and thus the luminance for these regions have the luminance value of zero (0).

There are both light emitting portions and non-light emitting portions in the regions between the broken lines V1 and V2 as well as between the broken lines V3 and V4. The proportion of the light emitting portions becomes larger from the broken line V1 to the broken line V2. The luminance increases accordingly at a constant rate until the luminance reaches the luminance B of the pattern W. Likewise, the proportion of the non-light emitting portions becomes smaller from the broken line V3 to the broken line V4. The luminance decreases accordingly at a constant rate. The luminance B of the pattern W is kept at the region between the broken lines V2 and V3.

As apparent from the above, the edges of the pattern W contains the regions of which luminance changes at a constant rate (between the broken lines V1 and V2 as well as between the broken lines V3 and V4), that is, the regions having the gradient of the luminance curve. This gradient produces the blurry images around the edges. The viewer's perception of the pattern W is influenced as the pattern W having the five-pixel width L0 is identified to have a larger width L1.

Thus, the hold display device is suffered from significant degradation for animated images. On the contrary, the impulse display device has much less degradation. As described above with reference to FIG. 14B, the luminance drops down suddenly just after the beginning of each frame period. This causes shorter distances between the broken lines V1 and V2 as well as between V3 and V4 (FIG. 15B) as compared with those obtained in the hold display device, resulting in smaller blurry regions. Accordingly, the current accepted theory is that the impulse display devices are superior to the hold display devices in displaying animated images.

Attempts have been made to improve performance of the display for animations by means of making the display characteristics of the hold display devices much closer to those of the impulse display devices. A technique has been proposed as one approach that involves in inserting a black signal (hereinafter, referred to as a "black period") into one frame period.

FIG. 16 is a graphical representation of a luminance profile for a given pixel obtained when a black period is inserted into one frame period. As shown in FIG. 16, one frame period is divided into a video display period and the black period. The black periods contribute to making the luminance profiles of the hold display device closer to those of the impulse display device as shown in FIG. 14B.

FIGS. 17A and 17B are explanation views showing display characteristics of a hold display device when a black period is inserted into one frame period, in conjunction with the case where white patterns travel on a black background, in which FIG. 17A shows the displacement of the pattern while FIG. 17B shows a luminance distribution thereof.

In FIG. 17A, the broken lines V1 and V2 correspond to a displacement of the viewer's eyes gazing at the pixel having the smallest value n of the pixels Pn that make up the pattern W. More specifically, the broken lines V1 and V2 correspond to the displacement of the viewer's eyes at the beginning of the black period Tb and the video display period Ta, respectively, for the pixel in question. The broken lines V3 and V4 correspond to a displacement of the viewer's eyes gazing at the pixel having the largest value n of the pixels Pn that make up the pattern W. More specifically, the broken lines V3 and V4 correspond to the displacement of the viewer's eyes at the beginning of the black period Tb and the video display period Ta, respectively, for the pixel in question.

Comparison between FIGS. 17B and 15B shows that the black periods Tb make it possible to reduce the distance between the broken lines V1 and V2 as well as the distance between the broken lines V3 and V4. The smaller distances result in reduction of size of the regions having the gradient of the luminance curve, which in turn reduces the size of the blurry regions around the edges of the pattern W.

While the video display periods in the frame periods precede the black periods in FIGS. 16 and 17, it should be understood the black periods may precede the video display periods.

With the black periods Tb inserted in the frame periods as shown in FIG. 17B, the luminance of the pattern perceived by the viewer's eyes is equal to one hundred minus a, all multiplied by B, all divided by one hundred, i.e., B*(100−a)/100, wherein a represents a proportion of the black period Tb in one frame period T. The conventional display devices of the type described have drawbacks in that the black periods Tb inserted into the individual frame periods cause reduction in luminance in proportion to the percentage of the black period Tb in one frame period, as can be seen from the equation.

In addition, the video display periods and the black periods are fixed in order for all frame periods of the video image made up of these periods. Thus, it is impossible to change the order appropriately depending on the type of the video image to be displayed.

SUMMARY OF THE INVENTION

The present invention was made with respect to the above and an object thereof is to provide a display device a method for driving the same with which image degradation can be reduced that would occur in producing animated images on the display device.

In order to solve the above-mentioned problems, a display device according to the present invention comprises a display unit on which a video image made up of a plurality of pixels is displayed; a driving unit for driving the display unit; a video signal memory unit for storing a video signal supplied from outside; and a control unit adapted to generate a display signal in accordance with the video signal stored on the video signal memory unit to control driving operation of the driving unit made on the display unit by using the display signal, the display signal being indicative of a video image to be displayed on the display unit for a given frame period, the control unit comprising: calculating means for calculating a value of luminance for a video image to be displayed for a first frame period and a value of luminance for a video image to be displayed for a second frame period subsequent to the first frame period, the values of luminance being calculated for each one of pixels in accordance with the video signal supplied from outside; comparing means for comparing the value of the luminance for the video image to be displayed for the first frame period and the value of the luminance for the video image to be displayed for the second frame period; determining means for determining, according to the comparison result, whether it is necessary to insert a black period into the first frame period to display a black image; and generating means for generating the display signal for the first frame period when the determining means determines that the black period is required, the display signal to be generated having the black period and a video display period for displaying a video image. With this configuration, not all pixels are displayed as black. Instead, only such pixels are displayed as black that are determined to be so in accordance with the change in luminance between the first and second frame periods. Therefore, it is possible to limit the blur of the video images without deteriorating the luminance of the entire display screen.

In the display device according to the present invention, the generating means may be configured to determine the order of the video display period and the black period. With this configuration, the video display periods and the black periods can be aligned in an appropriate order in accordance with the change in luminance between the first and second frame periods. Therefore, image degradation can be reduced more efficiently.

The present inventors have found that the image degradation can be reduced by means of inserting the black period into the first frame period such that the first frame period has the black period and the video image period arranged in this order, when the first frame period has a lower luminance than the second frame period, i.e., when the luminance becomes high. The present inventors have also found that the image degradation can be reduced by means of inserting the black period into the first frame period such that the first frame period has the video image period and the black period arranged in this order, when the first frame period has a higher luminance than the second frame period, i.e., when the luminance becomes low.

Thus, in the display device according to the present invention, the generating means may be configured to generate the display signal such that the video display period precedes the black period, when the value of the luminance for the video image to be displayed for the second frame period is smaller than the value of the luminance for the video image to be displayed for the first frame period and, when a difference is equal to or larger than a predetermined value between the value of the luminance for the video image to be displayed for the first frame period and the value of the luminance for the video image to be displayed for the second frame period. The generating means may be configured to generate the display signal such that the black period precedes the video display period, when the value of the luminance for the video image to be displayed for the second frame period is larger than the value of the luminance for the video image to be displayed for the first frame period and, when a difference is equal to or larger than a predetermined value between the value of the luminance for the video image to be displayed for the first frame period and the value of the luminance for the video image to be displayed for the second frame period.

Furthermore, the display device according to the present invention may comprise a specifying unit for specifying the predetermined value such that the predetermined value falls within a range of luminance available for the display unit. This makes it possible to specify the predetermined value appropriately based on, for example, preference of a user.

In addition, in the display device according to the present invention, the video signal memory unit and the control unit may each comprise a memory area capable of storing the video signal corresponding to one frame. With this configuration, the video signal memory unit is required only to have a memory area for the video signal corresponding to one frame, even when the value of the luminance for the video image for the first frame period is compared with the value of the luminance for the video image for the second frame period, that is, when the video signals corresponding to two frames are compared. Therefore, the configuration becomes cost-effective.

The display device according to the present invention may further comprise a specifying unit for specifying a time length of the black period. This makes it possible to specify a time length of the black period appropriately based on, for example, preference of a user.

In the display device according to the present invention, the video signal supplied from outside represents a gray scale of the video image to be displayed on the display unit and the display device further comprises correspondence information memory unit for storing correspondence information indicative of a correspondence between the gray scale and the luminance. The calculating means may be configured to calculate the value of the luminance for the video image to be displayed for the first frame period and the value of the luminance for the video image to be displayed for the second frame period in accordance with the gray scale represented by the video signal supplied from outside and the correspondence information stored on the correspondence information memory unit. This offers more effective digital signal processing.

In the display device according to the present invention, the control unit may further comprise correcting means for correcting the display signal generated by the generating means such that a value of luminance for a video image to be displayed during the video display period is higher than the value of the luminance for the video image to be displayed for the first frame period. This enhances the edges of the video image presented on the display unit and the blur which otherwise occurs at or around the edges can be reduced.

Furthermore, in the display device according to the present invention, the video signal supplied from outside represents a gray scale of the video image to be displayed on the display unit. The display device further comprises correspondence information memory unit for storing correspondence information indicative of a correspondence between the gray scale and the luminance. The correcting means may be configured to convert a value of luminance for a video image to be displayed during the video display period into a gray scale of the video image in accordance with the correspondence information stored on the correspondence information memory unit. This offers more effective digital signal processing.

In the display de according to the present invention, the correcting means may be configured to convert the value of the luminance for the video image to be displayed during the video display period into a gray scale corresponding to the value of the luminance that is the closest to the value of the luminance for the video image to be displayed during the video display period out of the values of luminance represented by the correspondence information, when the value of the luminance for the video image to be displayed during the video display period is not represented by the correspondence information. With this configuration, it is possible to minimize a difference between the value of the luminance for the video image actually displayed on the display unit and the value of the luminance for the video image to be displayed during the video display period determined by the correction carried out by the correcting means.

Furthermore, in the display device according to the present invention, the correcting means may be configured to convert the value of the luminance for the video image to be displayed during the video display period into a gray scale corresponding to the largest value of the luminance but not larger than the value of the luminance for the video image to be displayed during the video display period out of the values of luminance represented by the correspondence information, when the value of the luminance for the video image to be displayed during the video display period is not represented by the correspondence information. In addition, the correcting means may be configured to convert the value of the luminance for the video image to be displayed during the video display period into a gray scale corresponding to the smallest value of the luminance but larger than the value of the luminance for the video image to be displayed during the video display period out of the values of luminance represented by the correspondence information, when the value of the luminance for the video image to be displayed during the video display period is not represented by the correspondence information. Accordingly, the luminance can be converted more easily into the gray scale.

A method for driving a display device according to the present invention is a method for driving a display device having a display unit on which a video image made up of a plurality of pixels is displayed, the method comprising the steps of: calculating a value of luminance for a video image to be displayed for a first frame period and a value of luminance for a video image to be displayed for a second frame period subsequent to the first frame period, the values of luminance being calculated for each one of pixels in accordance with the video signal supplied from outside; comparing the value of the luminance for the video image to be displayed for the first frame period and the value of the luminance for the video image to be displayed for the second frame period; determining, according to the comparison result, whether it is necessary to insert a black period into the first frame period to display a black image; generating the display signal representing the video image that should be displayed on the display unit, the display signal having a video display period for displaying a video image and a black period for displaying black; and driving a display device to display the video image for the first frame period by using the display signal generated. This makes it possible to limit the blur of the video images without deteriorating the luminance of the entire display screen.

In the method for driving a display device according to the present invention, the step of generating the display signal may determine the order of the video display period and the black period.

In the method for driving a display device according to the present invention, the step of generating the display signal may generate the display signal such that the video display period precedes the black period, when the value of the luminance for the video image to be displayed for the second frame period is smaller than the value of the luminance for the video image to be displayed for the first frame period and, when a difference is equal to or larger than a predetermined value between the value of the luminance for the video image to be displayed for the first frame period and the value of the luminance for the video image to be displayed for the second frame period.

Furthermore, in the method for driving a display device according to the present invention, the step of generating the display signal may generate the display signal such that the black period precedes the video display period, when the value of the luminance for the video image to be displayed for the second frame period is larger than the value of the luminance for the video image to be displayed for the first frame period and, when a difference is equal to or larger than a predetermined value between the value of the luminance for the video image to be displayed for the first frame period and the value of the luminance for the video image to be displayed for the second frame period.

In addition, in the method for driving a display device according to the present invention, the video signal supplied from outside represents a gray scale of the video image to be displayed on the display unit, wherein the calculation step may calculate the value of the luminance for the video image to be displayed for the first frame period and the value of the luminance for the video image to be displayed for the second frame period in accordance with correspondence information indicative of a correspondence between the gray scale and the luminance and the gray scale represented by the video signal supplied from outside.

The method for driving a display device according to the present invention may further comprise the step of correcting the display signal generated such that a value of luminance for a video image to be displayed during the video display period is higher than the value of the luminance for the video image to be displayed for the first frame period.

In addition, in the method for driving a display device according to the present invention, the video signal supplied from outside represents a gray scale of the video image to be displayed on the display unit, wherein the step of correcting the display signal may convert a value of luminance for a video image to be displayed during the video display period into a gray scale of the video image in accordance with correspondence information indicative of a correspondence between the gray scale and the luminance.

In the method for driving a display device according to the present invention, the step of correcting the display signal may convert the value of the luminance for the video image to be displayed during the video display period into a gray scale corresponding to the value of the luminance that is the closest to the value of the luminance for the video image to be displayed during the video display period out of the values of luminance represented by the correspondence information, when the value of the luminance for the video image to be displayed during the video display period is not represented by the correspondence information.

In the method for driving a display device according to the present invention, the step of correcting the display signal may convert the value of the luminance for the video image to be displayed during the video display period into a gray scale corresponding to the largest value of the luminance but not larger than the value of the luminance for the video image to be displayed during the video display period out of the values of luminance represented by the correspondence information, when the value of the luminance for the video image to be displayed during the video display period is not represented by the correspondence information.

Moreover, in the method for driving a display device according to the present invention, the step of correcting the display signal may convert the value of the luminance for the video image to be displayed during the video display period into a gray scale corresponding to the smallest value of the luminance but larger than the value of the luminance for the video image to be displayed during the video display period out of the values of luminance represented by the correspondence information, when the value of the luminance for the video image to be displayed during the video display period is not represented by the correspondence information.

These objects as well as other objects, features and advantages of the invention will become apparent to those skilled in the art from the following description with reference to the accompanying drawings.

BRIEF DESCRIPTION OF THE DRAWINGS

FIG. 5 is a table showing the correspondences between the gray scale and the luminance that is stored in the display device according to the first embodiment of the present invention;

FIGS. 6A to 6D are views used to describe the display signals generated in the display device according to the first embodiment of the present invention, in which FIG. 6A is a schematic view showing an example of a video signal, FIG. 6B is a schematic view showing an example of a display signal containing a black period provided after a video display period, FIG. 6C is a schematic view showing an example of a display signal containing a black period provided before a video display period, and FIG. 6D is a schematic view showing an example of a display signal having no black period;

FIGS. 7A to 7D are timing diagrams showing operations of the display device according to the first embodiment of the present invention, in which FIG. 7A shows durations during which a video signal is supplied to the display device, FIG. 7B shows durations during which a signal is written into a frame memory, FIG. 7C shows durations during which a signal is read out of the frame memory, and FIG. 7D shows durations during which a liquid crystal panel produces a video image;

FIGS. 8A and 8B are explanation views showing display characteristics of the display device according to the first embodiment of the present invention in conjunction with the case where white patterns travel on a black background, in which FIG. 8A shows the displacement of the pattern and FIG. 8B shows a luminance distribution thereof;

FIGS. 11A and 11B are views used to describe a display signal having a black period provided after a video display period generated in the display device according to the second embodiment of the present invention, in which FIG. 11A is a schematic view showing an example of a display signal of which luminance is corrected to $B_n'$ for the video display period and FIG. 11B is a like schematic view showing an example of a display signal of which luminance is corrected to $B_{max}$;

FIGS. 12A and 12B are views used to describe a display signal having a black period provided before a video display period generated in the display device according to the second embodiment of the present invention, in which FIG. 12A is a schematic view showing an example of a display signal of which luminance is corrected to $B_n'$ for the video display period and FIG. 12B is a like schematic view showing an example of a display signal of which luminance is corrected to $B_{max}$;

FIGS. 13A and 13B are explanation views showing display characteristics of the display device according to the second embodiment in conjunction with the case where white patterns travel on a black background, in which FIG. 13A shows the displacement of the pattern and FIG. 13B shows a luminance distribution thereof;

FIGS. 14A and 14B are graphical representations of luminance profiles for a given pixel of the display devices plotted against frame period, in which FIG. 14A is a graphical representation of a luminance profile obtained in a hold display device and FIG. 14B is a graphical representation of a luminance profile obtained in an impulse display device;

FIGS. 15A and 15B are explanation views showing display characteristics of the hold display device in conjunction with the case where white patterns travel on a black background, in which FIG. 15A shows the displacement of the pattern and FIG. 15B shows a luminance distribution thereof;

FIGS. 17A and 17B are explanation views showing display characteristics of the hold display device when a black period is inserted into each frame, in conjunction with the case where white patterns travel on a black background, in which FIG. 17A shows the displacement of the pattern while FIG. 17B shows a luminance distribution thereof.

DETAILED DESCRIPTION OF THE PREFERRED EMBODIMENTS

Embodiments of the present invention are described with reference to the drawings.
(First Embodiment)

Figure 1:
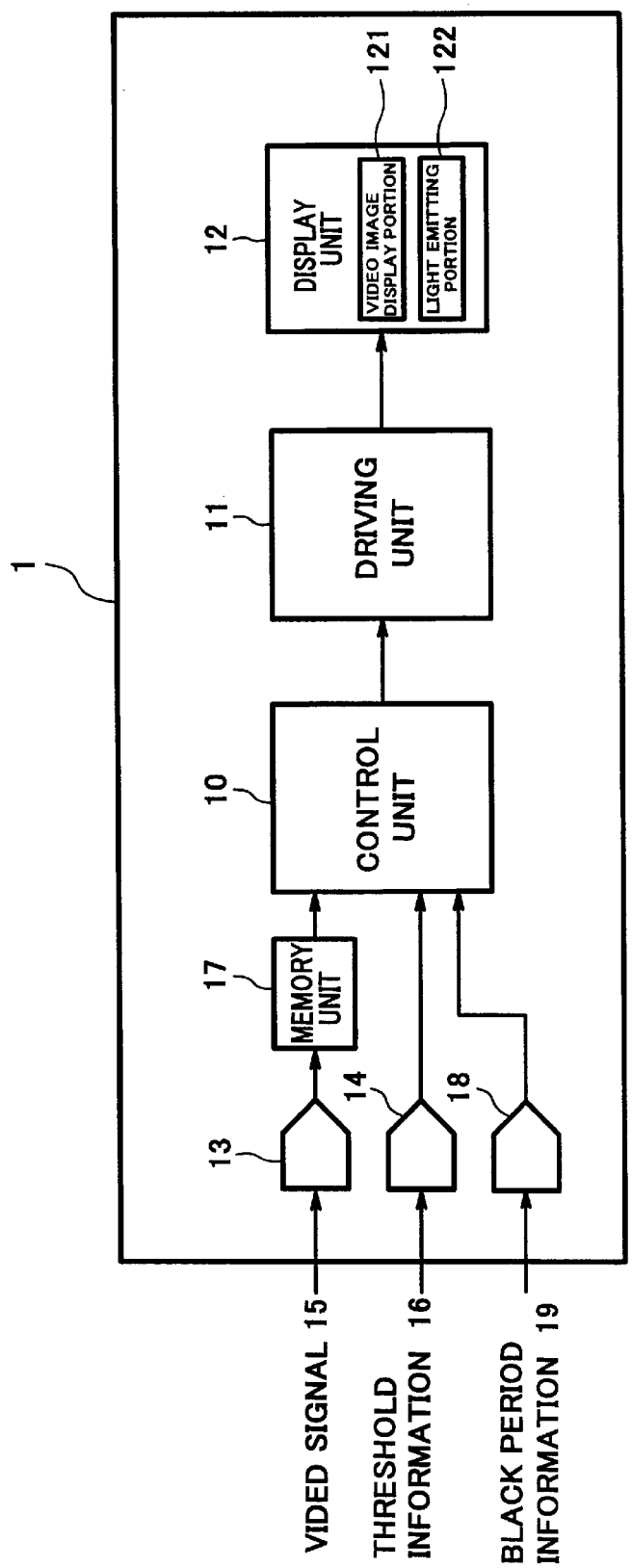
FIG. 1 is a functional block diagram illustrating a configuration of a display device according to a first embodiment of the present invention.

FIG. 1 is a functional block diagram illustrating a configuration of a display device according to a first embodiment of the present invention. As shown in FIG. 1, a display device 1 comprises a control unit 10, a display unit 12, a driving unit 11, and a memory unit 17. The control unit 10 generates display signals in response to video signals as described below. The display unit is for producing video images thereon. The driving unit 11 drivingly controls the display unit 12 in accordance with the display signal(s) generated by the control unit 10. The memory unit 17 stores the video signals.

The display device 1 also comprises a video signal input terminal 13, a threshold information input terminal 14, and a black period information input terminal 18. The video signal input terminal 13 receives an input of a video signal 15 from an external device such as a personal computer. The threshold information input terminal 14 receives threshold information 16. The black period information input terminal 18 receives black period information 19 which is described more in detail below. The threshold information 16 is a data indicative of a threshold value that is used to determine whether or not a black period should be inserted, as described below. The black period information 19 is a data indicative of a length of the black period inserted into one frame period, as described below.

The video signal supplied to the display device through the above-mentioned video signal input terminal 13 is stored on the memory unit 17 temporarily and is then supplied to the control unit 10. The threshold information 16 and the black period information 19 received by the display device 1 through the threshold information input terminal 14 and the black period information input terminal 18, respectively, are supplied to the control unit 10 without any further processing. The control unit 10 carries out operations described below by using the video signal 15, the threshold information 16, and the black period information 19.

The above-mentioned display unit 12 comprises a video image display portion 121 for video images and a light emitting portion 122 that emits light to the video image display portion 121. The light emitting portion 122 emits the light such that a certain luminance is kept constant for each frame period. Therefore, the display device 1 is classified into a so-called hold display device. This means that the present embodiment may equally be applied to various display devices such as an active matrix liquid crystal display and an electroluminescence device, as long as such devices serve as a hold display device. Thus, an active matrix liquid crystal display is used as an example for the following description.

Figure 2:
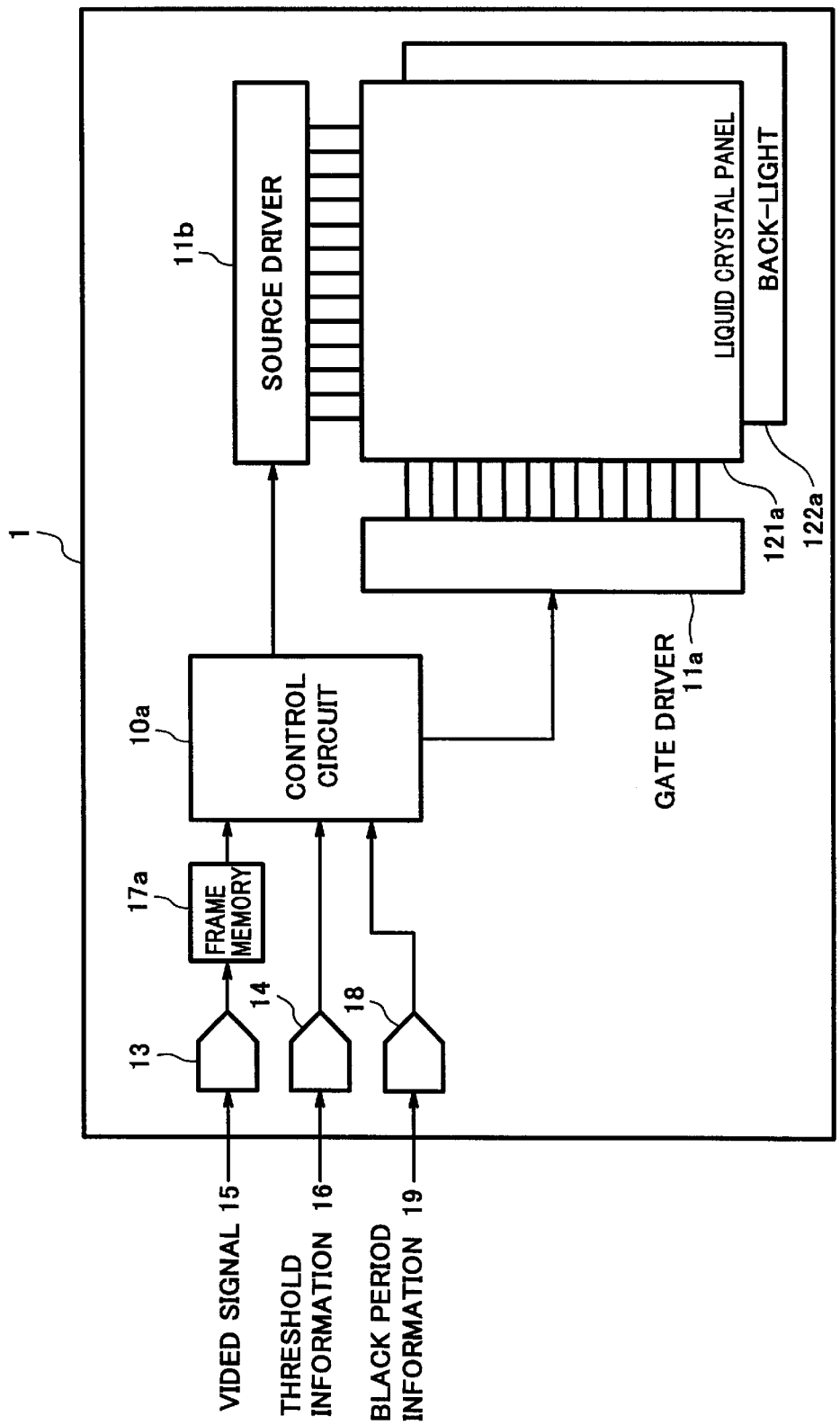
FIG. 2 is a block diagram illustrating a configuration of a display device according to the first embodiment of the present invention, which is implemented as an active matrix liquid crystal display.

FIG. 2 is a block diagram illustrating a configuration of a display device according to the this embodiment, which is implemented as an active matrix liquid crystal display. A liquid crystal panel 121a and a back-light 122a in FIG. 2 correspond to the video image display portion 121 and the light emitting portion 122 in FIG. 1, respectively. A gate driver 11a and a source driver 11b in FIG. 2 correspond to the driving unit 11 in FIG. 1. Likewise, a control circuit 10a in FIG. 2 corresponds to the control unit 10 in FIG. 1 while a frame memory 17a in FIG. 2 corresponds to the memory unit 17 in FIG. 1.

The above-mentioned liquid crystal panel 121a is a thin film transistor (TFT) liquid crystal cell well known in the art. The liquid crystal panel 121a comprises a TFT substrate (not shown) on which pixel electrodes and switching elements are formed for respective pixels of which boundaries are defined by gate lines and source lines that are arranged in a form of a matrix. The gate and source lines of the liquid crystal panel 121a are driven by the gate driver 11a and the source driver 11b, respectively. The gate driver 11a and the source driver 11b are controlled by the control circuit 10a.

The frame memory 17a is adapted to store temporarily the video signal 15 received through the video signal input terminal 13. The frame memory 17 comprises a memory area for storing the video signal 15 of at least one frame length.

The control circuit 10a comprises another memory area (not shown) which is available for storing the video signal 15 of at least one frame length, as in the case of the frame memory 17a.

While the display device 1 according to this embodiment receives the threshold information 16 and the black period information 19 supplied from an external device through the threshold information input terminal 14 and the black period information input terminal 18, respectively, the present invention is not limited to such a configuration. For example, the control circuit 10a may store the threshold information 16 and the black period information 19 that are previously supplied thereto.

In the display device 1 having the above-mentioned configuration, the control circuit 10a supplies control signals to the gate driver 11a and the source driver 11b in accordance with a display signal generated based on the video signal 15, the threshold information 16, and the black period information 19 as described below for display in liquid crystal panel 121a utilizing the light emitting of the back-light 122a. Consequently, the gate driver 11a applies a gate signal voltage to the gate lines to successively turn on the switching elements of the pixels while the source driver 11b successively applies the display signal voltage to the pixel electrodes of the pixel through the source lines in synchronism with the turn-on timing. This results in modulation of the liquid crystal molecules of the liquid crystal panel 121a, which in turn changes light transmittance for the light emitted from the back-light 122a. Therefore, a viewer of the display device 1 perceives the video image corresponding to the display signal.

Figure 3:
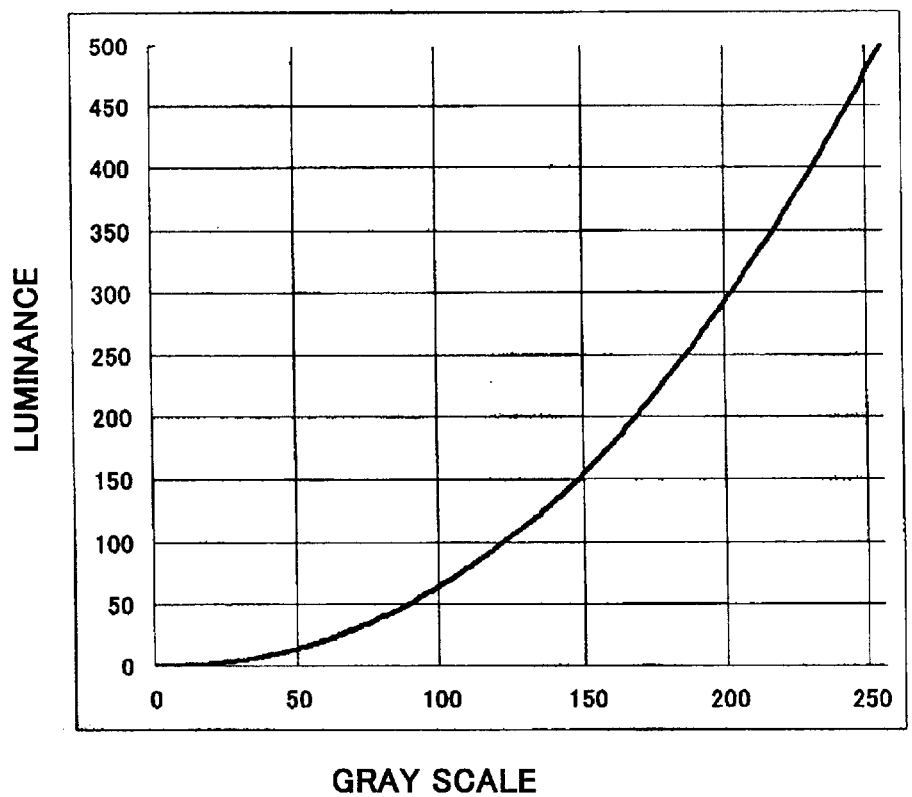
FIG. 3 is a graphical representation of luminance profiles plotted against gray scale.

Human perception allows us to recognize equi-proportionate changes of luminance. With this respect, video display devices are typically set to achieve a particular relationship between the luminance and the gray scale that can be represented as a curve as shown in FIG. 3. This graphical representation of the relationship is referred to as a gamma curve. In FIG. 3, the abscissa stands for the gray scale and the ordinate stands for the luminance. In this figure, the luminance is equal to 500 cd/m² for the gray scale having a value of 255. Reasonable video images for human perception can be obtained by means of providing the display characteristics having a less significant change in luminance for a gray scale value of relatively small and a significant change in luminance for a gray scale value of relatively large.

Cathode-ray tubes (CRTs) have a gamma curve as described above, that is, the relationship between the gray scale and the luminance automatically follows the gamma curve because of its display characteristics. No special signal processing is required to provide reasonable images for human perception on a CRT monitor. On the contrary, non-CRT displays that don't have a gamma curve require a certain correction of the video signals in order to achieve the gamma relationship between the gray scale and the luminance. The display device 1 according to this embodiment requires correction as well in order to provide reasonable images for human perception. This correction is typically directed to digital signals. The description herein is directed to a digital signal processing accordingly. For the purpose of the description, the above-mentioned video signal 15 is assumed to be a digital signal. The value of the digital signal represents the "gray scale". Some portions of the description herein are directed to the processing based on the luminance, but it should be understood by those skilled in the art that the actual processing is made on digital signals.

Next, operations of the display device according to this embodiment are described.

In this specification, the black luminance is such that at least an effect of reducing after-images can be observed. The present inventors make subjective assessments about the luminance in order to determine a range of luminance that exhibits such effects. As a result, it has been found that the after-images can be reduced at a given pixel when an additional video image having the luminance of 10% or less of the luminance of the video image intended to be displayed at that pixel. For example, when the luminance for a given pixel is 500 cd/m², then the black period should be determined to have the luminance of 50 cd/M² or lower.

Figure 4:
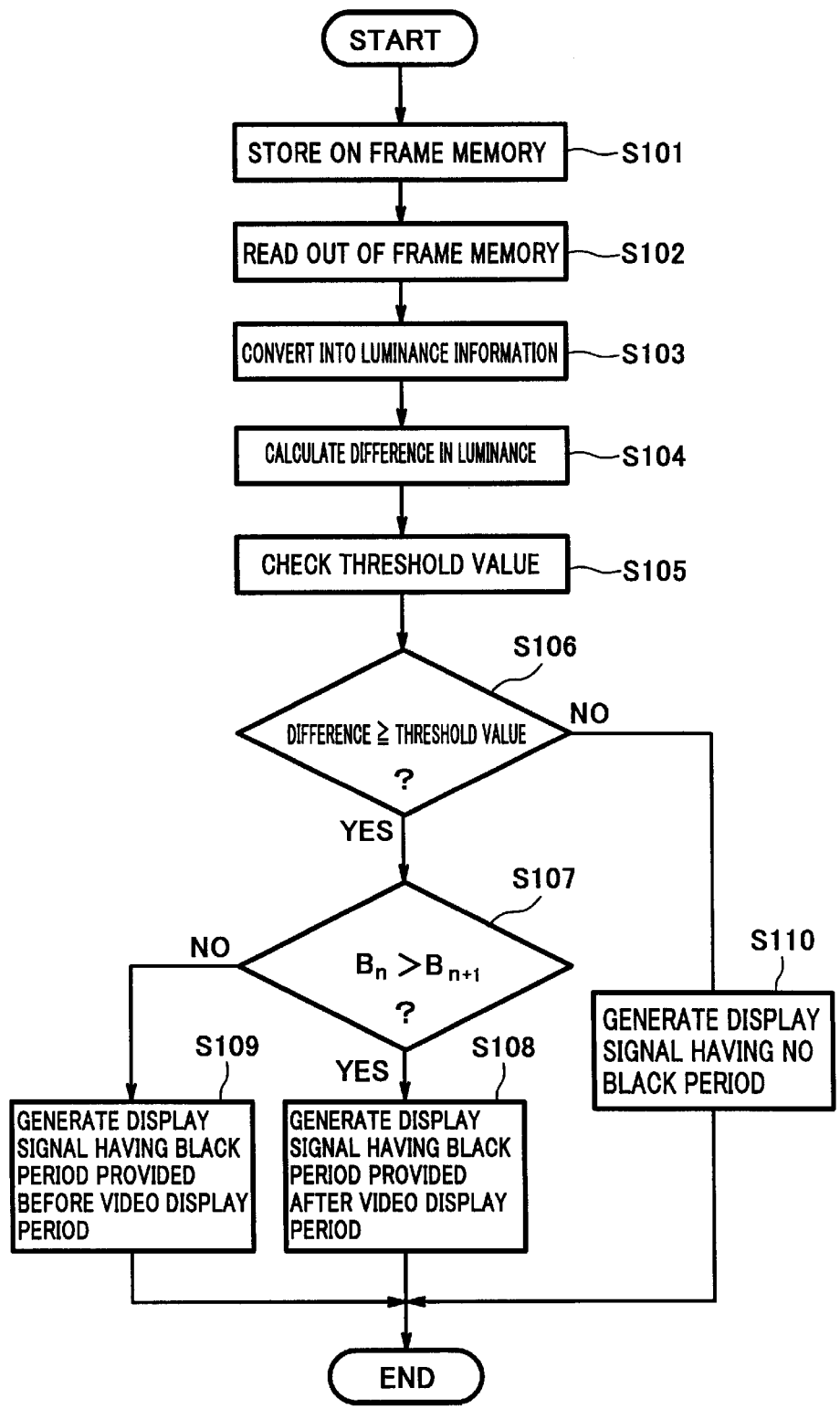
FIG. 4 is a flow chart illustrating operations for producing display signals, carried out by the display device according to the first embodiment of the present invention.

FIG. 4 is a flow chart illustrating operations for producing display signals, carried out by the display device according to this embodiment. The following operations are performed for each of the pixels.

In response to an input of a video signal from an external device, the display device 1 stores the received video signal into the frame memory 17a (S101). The control circuit 10a reads the video signals corresponding to two frames at a clock frequency higher than a synchronization frequency range for the video signals (S102). When it is impossible to store the video signals for two frames due to the size of the memory area in the frame memory 17a available only for the video signal corresponding to one frame, the following applies. The control circuit 10a reads the video signals for several pixels out of the frame memory 17a in advance, and stores them on the memory portion in the control circuit 10a. The video signal stored on the memory portion corresponds to one frame. Subsequently, the video signal 15 is supplied in real time to the control circuit 10a. The video signal 15 is stored on an available space in the frame memory 17a, the space being created as a result of reading the video signals for several pixels out of there. At the same timing, the control circuit 10a reads the video signals out of the memory portion. The above-mentioned procedures make it possible to compare the video signals for two frames in the control circuit 10a, even when the frame memory 17a is available only for the video signal for one frame.

The timings of wiring and reading the video signals into and out of the frame memory are described below.

Then, the control circuit 10a converts the gray scale represented by the video signals for two frames that are read out at the step S102 into the luminance by means of looking up the table showing the correspondences between the gray scale and the luminance as shown in FIG. 5 (S103). This correspondence table is previously stored on non-volatile memory means in the control circuit 10a. Instead of using the correspondence table, the luminance may be calculated from the equation $B=D^G$, wherein B represents the luminance and D represents the gray scale. The gray scale G has a value ranging from 1.5 to 3.5. The gray scale G is typically said to be preferable to have a value around 2.8.

Subsequently, the control circuit 10a calculates a difference between the frames by using the luminance obtained at the step S103 (S104). The control circuit 10a then checks a threshold value indicated by the threshold information 16 supplied through the threshold information input terminal 14 (S105) to determine whether the difference in luminance calculated at the step S104 is not smaller than the threshold value (S106). If the difference in luminance is neither equal to nor larger than the threshold value (NO at step S106), the control circuit 10a generates a display signal to show that the luminance according to the gray scale indicated by the video signal 15 is maintained for one frame period, that is, a display signal having only the video display period (S110). In this event, no black period is inserted in one frame period. The reason why the black period is not inserted when the difference in luminance is smaller than the threshold value lies in the fact that a relatively small difference in luminance does not cause an edge at that portion. This means that viewer's eyes do not follow that portion of an animated image. In order for the viewer to look at something, a certain subject to be watched is required such as a contour of an object. When there is no such subject to be watched, the viewer would not perceive any blurry video images. Therefore, it is unnecessary to insert the black period(s).

The threshold value may be updated by means of supplying new threshold information to the control circuit 16 through the threshold information input terminal 14. This feature allows adjustment of the luminance within the range of the luminance that the liquid crystal panel 121a can display, depending on the display characteristics of the liquid crystal panel 121a or the preference of the viewer. With a threshold having a relatively small value, a slight difference in luminance results in the determination that the black period is necessary. This reduces possibilities of producing after-images, effectively eliminating the problem of the blur of the animated images. On the other hand, a threshold value having a relatively large value is advantageous in that reduction in luminance can be limited because the black period is required only when there is a difference in luminance to a certain significant degree.

When the difference in luminance is equal to or larger than the threshold at the step S106 (YES at S106), it is determined whether a luminance $B_n$ of the video signal for an n-th frame (n is a natural number) is higher than a luminance $B_{n+1}$ of the video signal for an (n+1)-th frame (S107). When the luminance Bn is determined to be higher than the luminance $B_{n+1}$ (YES at S107), the display signal is generated that contains the video display period and the black period arranged in this order (S108). On the other hand, when the luminance $B_n$ is determined not higher than the luminance $B_{n+1}$ (NO at S107), then the display signal is generated that contains the black period and the video display period arranged in this order (S109). The length of the black period inserted in one frame is as indicated by the black period information 19 described above. The length may be varied in accordance with an input of the black period information 19 from a viewer that he or she enters into the display device.

The control circuit 10a supplies the control signals to the gate driver 11a and the source driver 11b in accordance with the display signal thus obtained. The gate driver 11a and the source driver 11b drive the liquid crystal panel 121a in response to these control signals. Consequently, the video image corresponding to the display signal is shown on the liquid crystal panel 121a.

Next, details of the display signal are described with reference to FIG. 6 for the purpose of facilitating the understanding of the display signals generated in the above-mentioned manner.

FIGS. 6A to 6D are views used to describe the display signals generated in the display device 1 according to this embodiment. More specifically, FIG. 6A is a schematic view showing an example of the video signal. FIG. 6B is a schematic view showing an example of the display signal containing the black period provided after the video display period. FIG. 6C is a schematic view showing an example of the display signal containing the black period provided before the video display period. FIG. 6D is a schematic view showing an example of the display signal having no black period. In FIGS. 6A and 6B, display signals 101 and 102 are those for given pixels in certain successive frames, that is, the n-th frame and the (n+1)-th frame. The display signals have the luminance values of $B_n$ and $B_{n+1}$ (more specifically, amplitudes of the video signal 15), respectively. The luminance values $B_n$ and $B_{n+1}$ represent the luminance for the above-mentioned video display period.

Referring back to the flow chart in FIG. 4 in combination with FIGS. 6A to 6D, the difference in luminance is calculated at the above-mentioned step S104 by means of performing $B_n - B_{n+1}$. When the absolute value of the luminance difference is equal to or larger than the threshold value, then the step S107 is carried out. At the step S107, the operation goes to the step S108 when the above-mentioned difference in luminance has a positive value to generate the display signal as shown in FIG. 6B. On the other hand, when the difference in luminance has a negative value, the operation goes to the step S109 to generate the display signal as shown in FIG. 6C. When the absolute value of the luminance difference is smaller than the threshold value, the operation goes to the step S110 to generate the display signal as shown in FIG. 6D.

In FIGS. 6B and 6C, the reference numeral 103 represents a display signal corresponding to the black period inserted in one frame period at the n-th frame. As shown in FIG. 6B, the display signal is generated at the step S108 that contains the video display period and the black period arranged in this order in one frame period. On the other hand, as shown in FIG. 6C, the display signal is generated at the step S109 that contains the black period and the video display period arranged in this order in one frame period.

As shown in FIG. 6D, the display signal generated at the step S110 is an equivalent of the video signal 15 with no black period inserted therein.

FIGS. 7A to 7D are timing diagrams showing operations of the display device 1 according to this embodiment. More specifically, FIG. 7A shows the durations during which the video signal 15 is supplied to the display device 1. FIG. 7B shows the durations during which a signal is written into the frame memory. FIG. 7C shows the durations during which a signal is read out of the frame memory. FIG. 7D shows the durations during which the liquid crystal panel 121a displays the video image. In this embodiment, the frame memory 17a is assumed to have the memory area available for the video signals for two frames. For the purpose of facilitating the understanding of the present invention, a frame memory for use in storing a portion of the video signal corresponding to the former one of two frames is referred to a first frame memory. Likewise, another frame memory for use in storing a remaining portion of the video signal corresponding to the latter one of two frames is referred to a second frame memory.

The present embodiment is based on the frame memories to which writing and reading access operations can be made simultaneously. However, any other frame memories that cannot handle the simultaneous writing/reading operations may be applied equally by means of, for example, controlling the access to the frame memories.

In order to know the exact timing of the operations performed by the display device 1, each frame period is made up of a vertical retrace line interval and a video signal interval. The video signal interval corresponds to the interval formed of the above-mentioned display signal period or of both the display signal period and the black period.

In FIGS. 7A to 7D, $D_n$ to $D_{n+3}$ represent the video signals for given pixels in the n-th to (n+3)-th frames, where n is a natural number.

In FIG. 7A, the durations during which the video signals are supplied to the display device are represented by the reference numeral 51 to 54 for the n-th to (n+3)-th frames. In FIG. 7B, the durations during which the video signal is written into the first frame memory or the second frame memory are represented by the reference numerals 55 to 58. As shown in FIGS. 7A and 7B, when the video signal is supplied to the display device 1 from outside, the video signal is alternately written into the first and second frame memories at the same or generally same timing of the reception of the video signal by the display device 1.

In FIG. 7C, the durations during which the video signal is read out of the first frame memory are represented by the reference numerals 509 to 514. Likewise, the durations during which the video signal is read out of the first frame memory are represented by the reference numerals 515 to 520. At least two scanning operations are required for one frame period because the black period may possibly be inserted into one frame period at the beginning or end thereof, as described above. Therefore, the readout access to the frame memory should be done at least two times per one frame period.

As apparent from the durations 509, 510, 515, and 516, the timing at which the video signal for the n-th frame is read out of the first frame memory generally coincides with the timing at which the video signal for the (n+1)-th frame is read out of the second frame memory.

In addition, the readout access to these memories lasts for similar durations. Therefore, the values of the luminance can be compared with each other for the video signals for the n-th and (n+1)-th frames to calculate the difference between them. The display signals are generated in accordance with the difference in luminance. The video images corresponding to the display signals are displayed during the durations 521 and 522. Afterward, the video signal is read out of the frame memory at the similar timings to generate the display signal. Then, the video image corresponding to the display signal is displayed on the liquid crystal panel 121*a*.

Next, the display characteristics of the display device according to this embodiment are described.

Figures 8A, 8B:
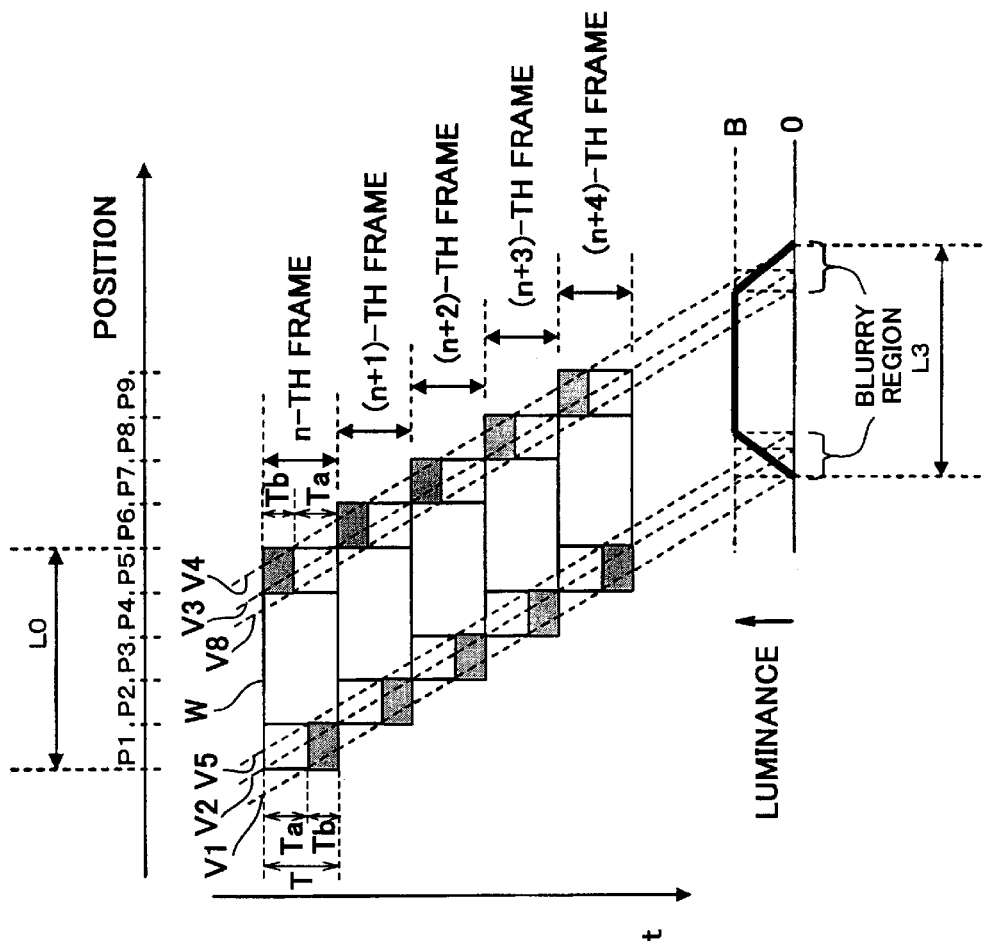

FIGS. 8A and 8B are explanation views showing display characteristics of the display device according to the this embodiment in conjunction with the case where white patterns travel on a black background. FIG. 8A shows the displacement of the pattern and FIG. 8B shows a luminance distribution thereof. In FIG. 8A, the ordinate stands for the time; the abscissa stands for the horizontal positions on the display screen; and Pn (n is a natural number) represents pixels.

The broken lines V1 to V4 as well as the broken lines V5 to V8 represent the movement of the eyes of a viewer who are looking at a moving pattern W. The broken lines V1, V2 and V5 correspond to a displacement of the viewer's eyes gazing at the pixel having the smallest value n of the pixels Pn that make up the pattern W. More specifically, the broken lines V1 and V5 correspond to the displacement of the viewer's eyes at the beginning of the black period Tb in one frame period T. The broken line V2 corresponds to the displacement of the viewer's eyes at the beginning of the video display period Ta in the same frame period.

On the other hand, the broken lines V3, V4 and V8 correspond to a displacement of the viewer's eyes gazing at the pixel having the largest value n of the pixels Pn that make up the pattern W. More specifically, the broken line V3 corresponds to the displacement of the viewer's eyes at the beginning of the black period Tb in one frame period T. The broken lines V4 and V8 correspond to the displacement of the viewer's eyes at the beginning of the video display period Ta in the same frame period.

As shown in FIG. 8B, the region left from the broken line V1 has the luminance value of zero (0). The luminance becomes higher at a constant ratio in the region defined between the broken lines V1 and V2. On the broken line V2, the value of the luminance is equal to that of the pattern W, i.e., B*(100−a)/100, wherein a represents a proportion of the black period Tb in one frame period T. The luminance becomes higher at the same ratio in the region defined between the broken lines V2 and V5. On the broken line V5, the luminance has the largest value of B. The luminance B is kept for the regions defined between the broken lines V5 and V8.

The luminance becomes lower at a constant ratio in the region defined between the broken lines V8 and V3. On the broken line V3, the value of the luminance is again equal to B*(100−a)/100. The luminance becomes lower at the same ratio in the region defined between the broken lines V3 and V4. On the broken line V4, the luminance has the value of zero (0).

Figures 15A, 15B:
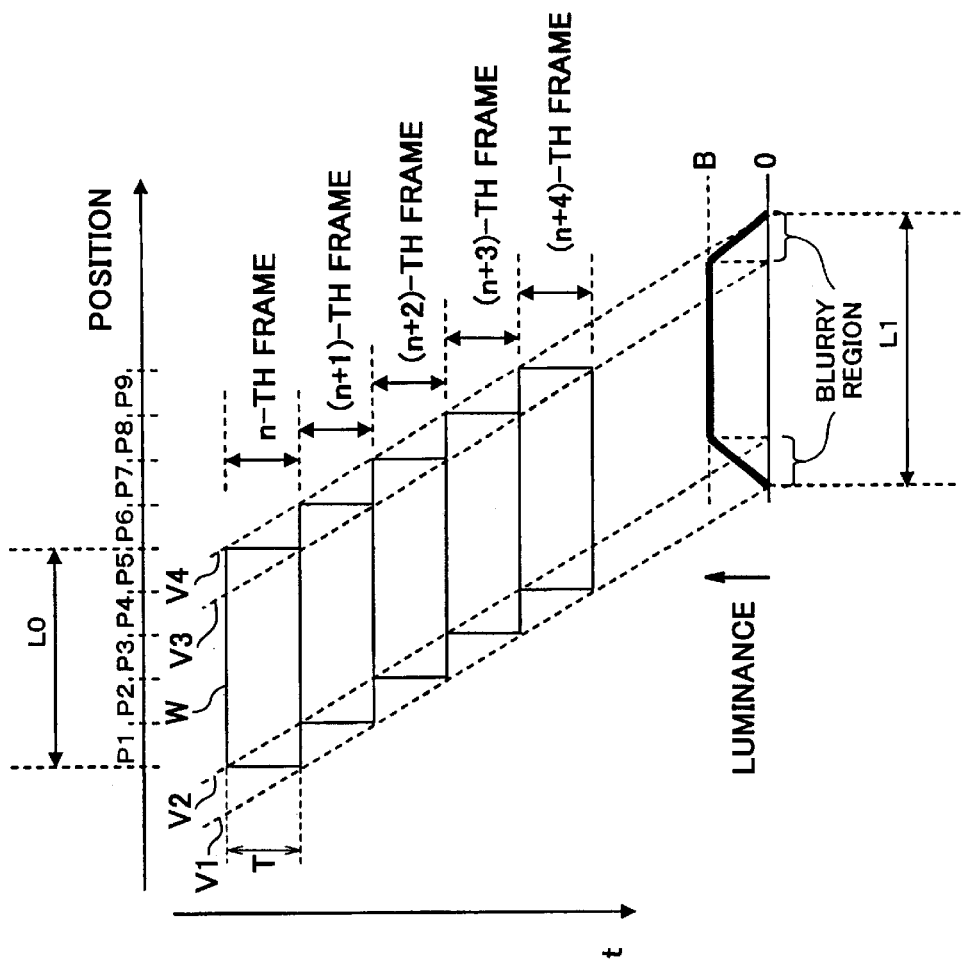
Figure 16:
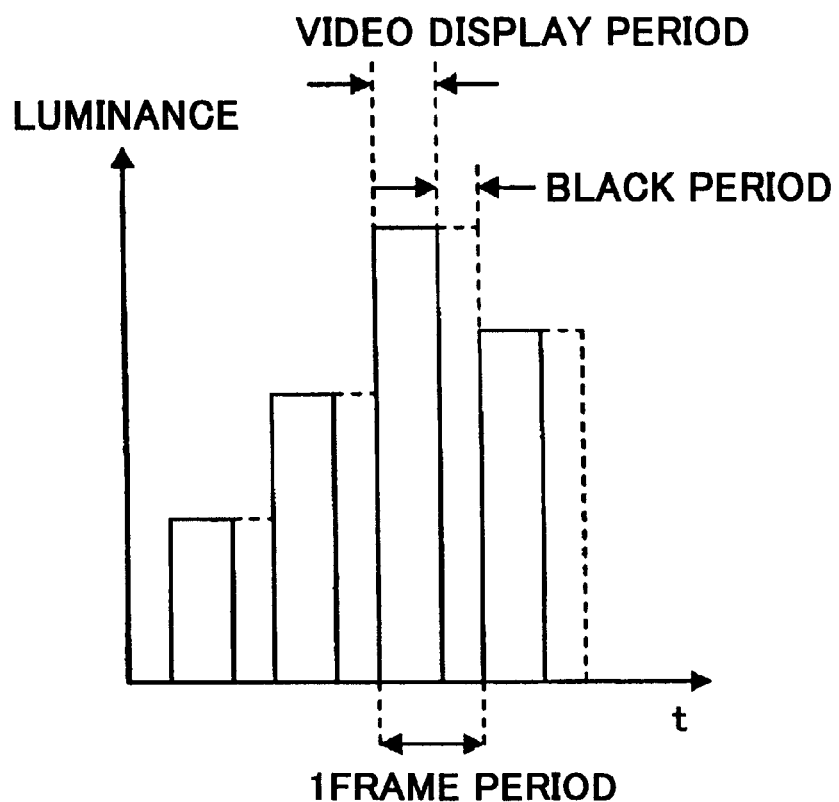
FIG. 16 is a graphical representation of a luminance profile for a given pixel obtained when a black period is inserted into one frame period.

For the purpose of comparison, FIGS. 15 and 17 are referred again in which the display characteristics of the conventional display device are given. The blurry region shown in FIG. 8B, that is, the region defined between the broken lines V1 and V5 has the same size as the blurry region shown in FIG. 15B. However, the width L3 of the pattern in FIG. 8B that is recognized by the viewer is smaller than the width L1 of the similar pattern in FIG. 15B. Therefore, the viewer can recognize the width closer to that of the original pattern W through the display device according to the present invention as compared with the conventional display device. Accordingly, the display device according to the present invention is more effective in terms of limiting the image degradation as compared with the conventional display device.

Figures 17A, 17B:
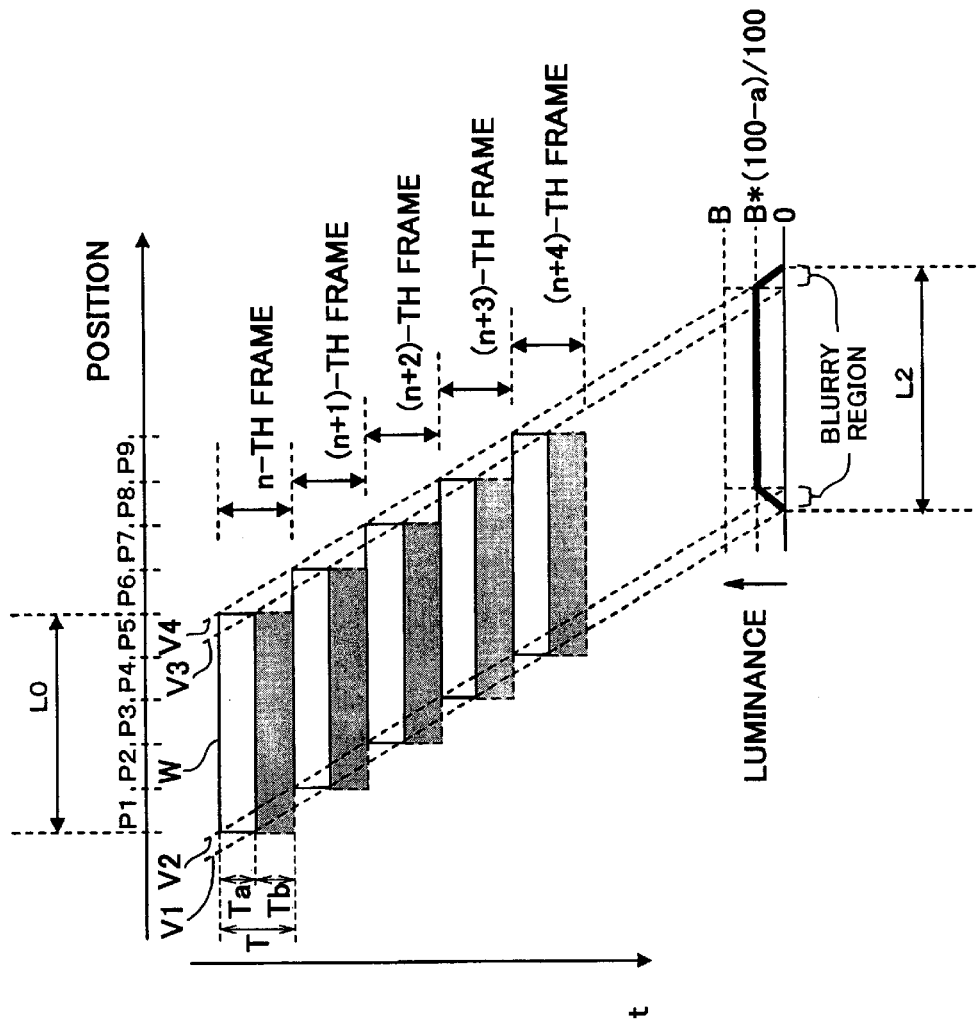

It should be noted that, even with the black period Tb, no reduction in luminance occurs in the display device of the present invention that is found in FIG. 17B. Thus, the present invention offers clear, better and bright display on the display device.

(Second Embodiment)

The second embodiment shows an example where the blurry region can be reduced by means of inserting the black period and correcting the luminance for the video display period.

The display device according to the second embodiment is similar in configurations to the display device described in conjunction with the first embodiment. Therefore, description of such configurations is omitted. Operations of the display device according to the second embodiment are described now.

Figure 9:
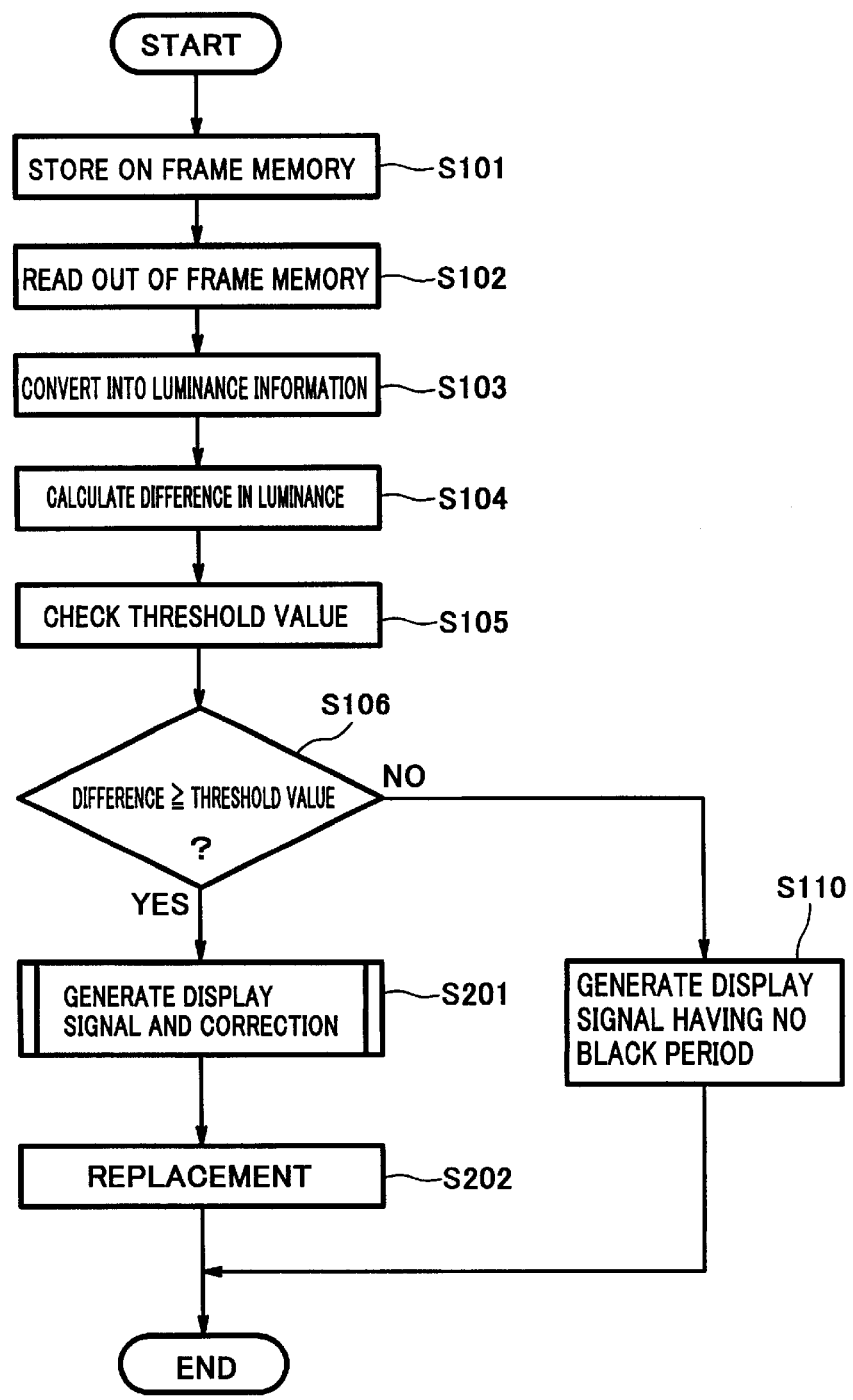
FIG. 9 is a flow chart illustrating operations for producing display signals, carried out by a display device according to a second embodiment of the present invention.

FIG. 9 is a flow chart illustrating operations for producing display signals, carried out by the display device according to this second embodiment. Similar steps to those described in conjunction with the first embodiment are depicted by similar reference numerals and description thereof is omitted.

The control circuit contained in the display device of this embodiment produces a display signal and performs corrections (S201) described below when it is determined that the difference in luminance is equal to or larger than the threshold value at the step S106.

Figure 10:
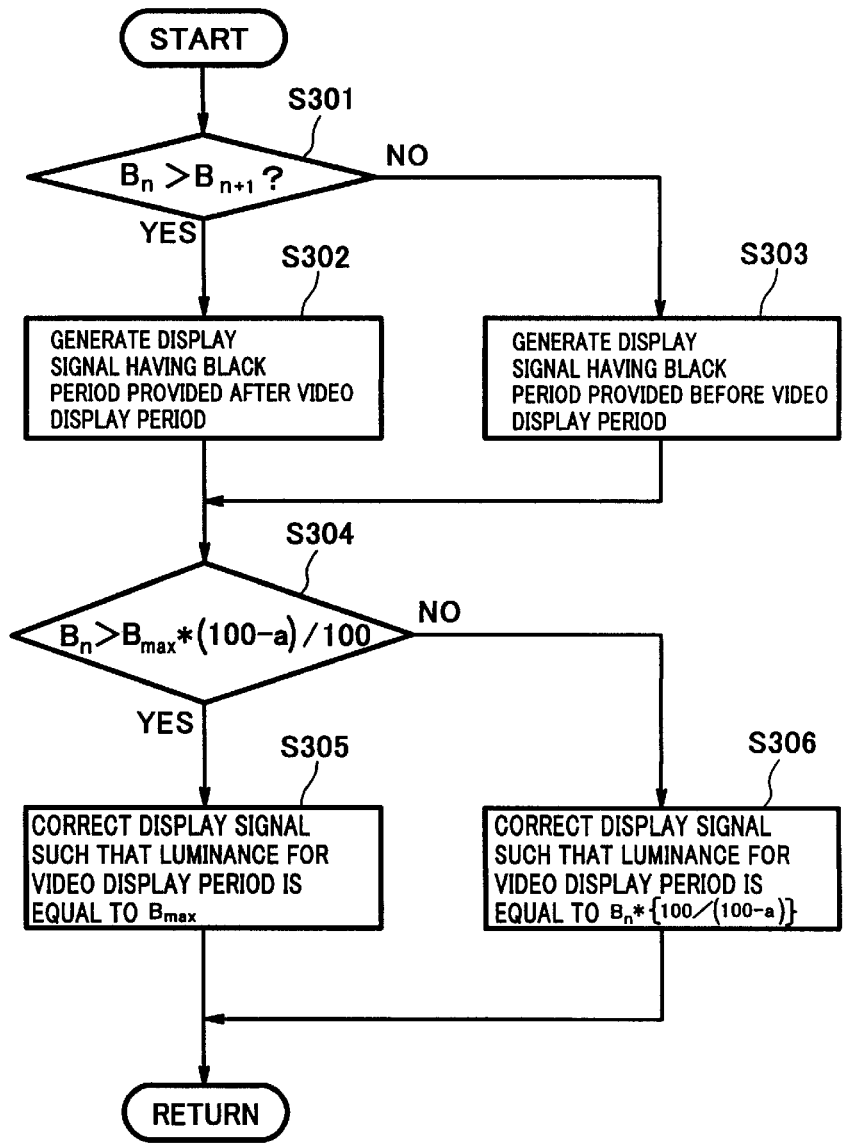
FIG. 10 is a flow chart illustrating operations for producing the display signals and for corrections, carried out by the display device according to the second embodiment of the present invention.

FIG. 10 is a flow chart illustrating operations for producing the display signals and for corrections, carried out by the display device according to this embodiment. In the following description, the proportion of the black period Tb in one frame period is represented by a% and the maximum luminance available for the liquid crystal panel of the display device is represented by $B_{max}$.

The control circuit determines whether the value of the luminance Bn for the video signal for the n-th frame is larger than the value of the luminance $B_{n+1}$ for the video signal for the (n+1)-th frame (S301). When it is determined that the value of the luminance Bn is larger than the value of the luminance $B_{n+1}$ (YES at S301), the control circuit generates the display signal having the video display period and the black period arranged in this order (S302). On the other hand, when it is determined that the value of the luminance $B_n$ is not larger than the value of the luminance $B_{n+1}$ (NO at S301), the control circuit generates the display signal having the black period and the video display period arranged in this order (S303).

Then, the control circuit determines that whether the following equation is satisfied (S304):

$$B_n > B_{max}*(100-a)/100 \quad \text{Eq. 1.}$$

When it is determined that the equation 1 is satisfied (YES at S304), the control circuit corrects the video signal generated at the step S302 or S303 such that the video display period has the luminance of $B_{max}$ (S305).

On the other hand, when it is determined that the equation 1 is not satisfied (NO at S304), the control circuit corrects the video signal generated at the step S302 or S303 such that the video display period has the luminance equal to the value calculated by the following equation 2 (S306):

$$B_n*\{100/(100-a)\} \quad \text{Eq. 2.}$$

Referring back to FIG. 9, the control circuit carries out the operations to generate the display signal and perform corrections in the manner described above, following which the control circuit replaces the luminance with the gray scale by using the correspondence table as shown in FIG. 5 (S202). When the correspondence table contains the gray scale corresponding to the luminance for the video display period after being subjected to the correction, the control circuit replaces the luminance with that gray scale. For example, when the luminance has the value of 402.64 cd/M$^2$, the gray scale corresponding to this is indicated as 232 as shown in FIG. 5. Therefore, the control circuit replaces the luminance with this value of 232. In this event, the luminance for the video display period after the correction is used without any further processing.

On the other hand, when the correspondence table does not contain the gray scale corresponding to the luminance for the video display period after being subjected to the correction, the control circuit carries out one of the following three different operations.

In the first mode of replacement, the control circuit retrieves the luminance having the value that is closest to the value of the luminance for the video display period from the values of luminance contained in the correspondence table. The control circuit then replaces the luminance with the gray scale corresponding to the retrieved luminance. For example, when the luminance has the value of 400.00 cd/m$^2$ for the video display period after being subjected to the correction, it can be found from FIG. 5 that the closest value of the luminance is 398.83. Therefore, the control circuit replaces the luminance with the corresponding gray scale of 231. In the first mode of replacement, it is possible to minimize the difference between the luminance for the video display period after being subjected to the correction and the luminance of the video image that is actually displayed on the display screen.

In the second mode of replacement, the control circuit retrieves the luminance having the largest value from of the values of luminance contained in the correspondence table, provided that the value to be retrieved is not larger than the value of the luminance for the video display period. The control circuit then replaces the luminance with the gray scale corresponding to the retrieved luminance. For example, when the luminance has the value of 400.00 cd/m$^2$ for the video display period after being subjected to the correction, it can be found from FIG. 5 that the largest value not larger than that luminance is 398.83. Therefore, the control circuit replaces the luminance with the corresponding gray scale of 231. In the second mode of replacement, it is possible to use simpler and easier operation as compared with the first mode of replacement.

In the third mode of replacement, the control circuit retrieves the luminance having the smallest value from of the values of luminance contained in the correspondence table, provided that the value to be retrieved is larger than the value of the luminance for the video display period. The control circuit then replaces the luminance with the gray scale corresponding to the retrieved luminance. For example, when the luminance has the value of 400.00 cd/m$^2$ for the video display period after being subjected to the correction, it can be found from FIG. 5 that the smallest value larger than that luminance is 402.64. Therefore, the control circuit replaces the luminance with the corresponding gray scale of 232. In the third mode of replacement, it is possible to use simpler and easier operation as compared with the first mode of replacement.

The control circuit supplies control signals to the gate driver and the source driver in accordance with the display signal thus obtained, as in the case described in conjunction with the first embodiment. The gate driver and the source driver drive the liquid crystal panel in response to the control signals, producing the video image corresponding to the display signal on the liquid crystal panel.

Next, details of the display signal are described with reference to FIGS. 11 and 12 for the purpose of facilitating the understanding of the display signals generated in the above-mentioned manner.

Figures 12A, 12B:
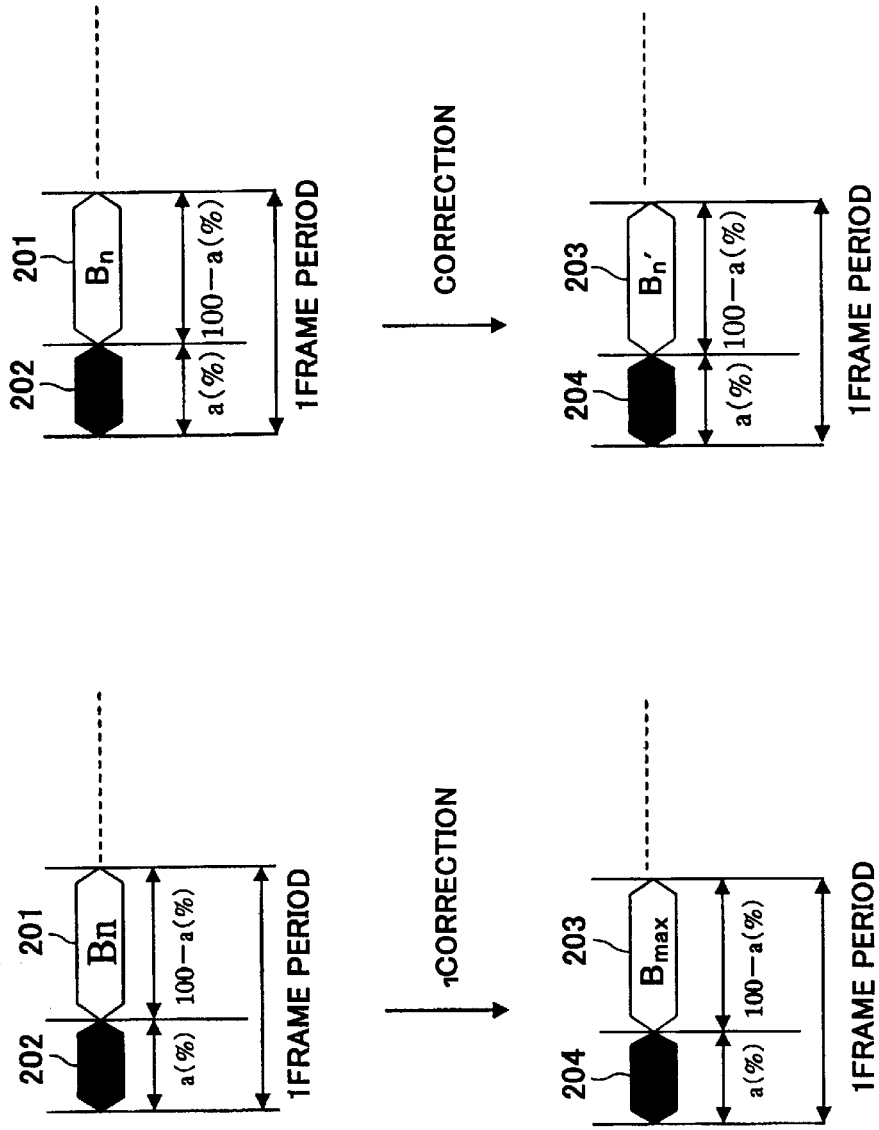

FIGS. 11A and 11B are views used to describe the display signal having the black period provided after the video display period generated in the display device according to this embodiment. More specifically, FIG. 11A is a schematic view showing an example of the display signal of which luminance is corrected to $B_n'$ for the video display period. FIG. 11B is a like schematic view showing an example of the display signal of which luminance is corrected to $B_{max}$. FIGS. 12A and 12B are views used to describe the display signal having the black period provided before the video display period generated in the display device according to this embodiment. More specifically, FIG. 12A is a schematic view showing an example of the display signal of which luminance is corrected to $B_n'$ for the video display period. FIG. 12B is a like schematic view showing an example of the display signal of which luminance is corrected to $B_{max}$ wherein B is calculated according to the above mentioned equation 2. In the figures, a represents a proportion of the black period Tb in one frame period.

In FIGS. 11 and 12, the display signal for the video display period is depicted by the reference numeral 201. The display signal for the black period is depicted by the reference numeral 202. Likewise, the display signal for the video display period after the correction is depicted by the reference numeral 203. The display signal for the black period after the correction is depicted by the reference numeral 204.

Referring back to the flow chart in FIG. 10 in combination with FIGS. 11 and 12, when the step S301 indicates that the $B_n$ is higher than $B_{n+1}$, the display signal as shown either in FIG. 11A or in FIG. 11B is generated at the steps S306 or S305, respectively. On the other hand, when the step S301 indicates that the $B_n$ is equal to or lower than $B_{n+1}$, the display signal as shown either in FIG. 12A or in FIG. 12B is generated at the steps S305 or S306, respectively.

With the proportion of the black period Tb in one frame period represented by a%, the luminance of the video image that is actually displayed on the display screen during the n-th frame is reduced by the factor of $\{(100-a)/100\}$ of the luminance $B_n$ of the video image that should be displayed during the n-th frame. However, the when the luminance $B_n$ is equal to or lower than the $\{(100-a)/100\}$ multiplied by the maximum luminance $B_{max}$ available for the display device, the luminance $B_n$ is corrected to $\{100/(100-a)\}$ times. This correction offers the viewer with the luminance $B_n$ for the entire one frame period.

Next, the display characteristics of the display device according to this embodiment are described.

Figures 13A, 13B:
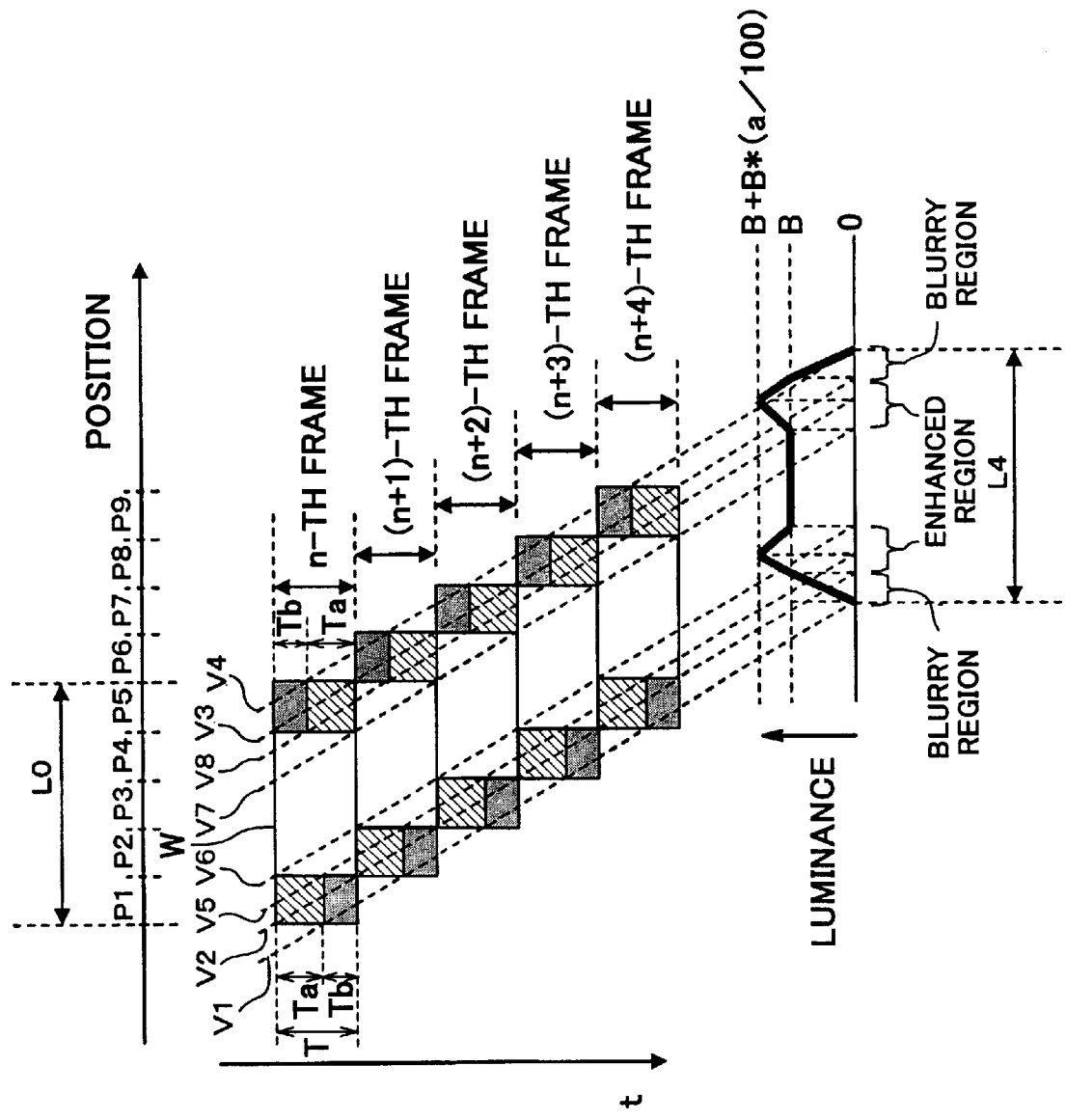
Figures 14A, 14B:
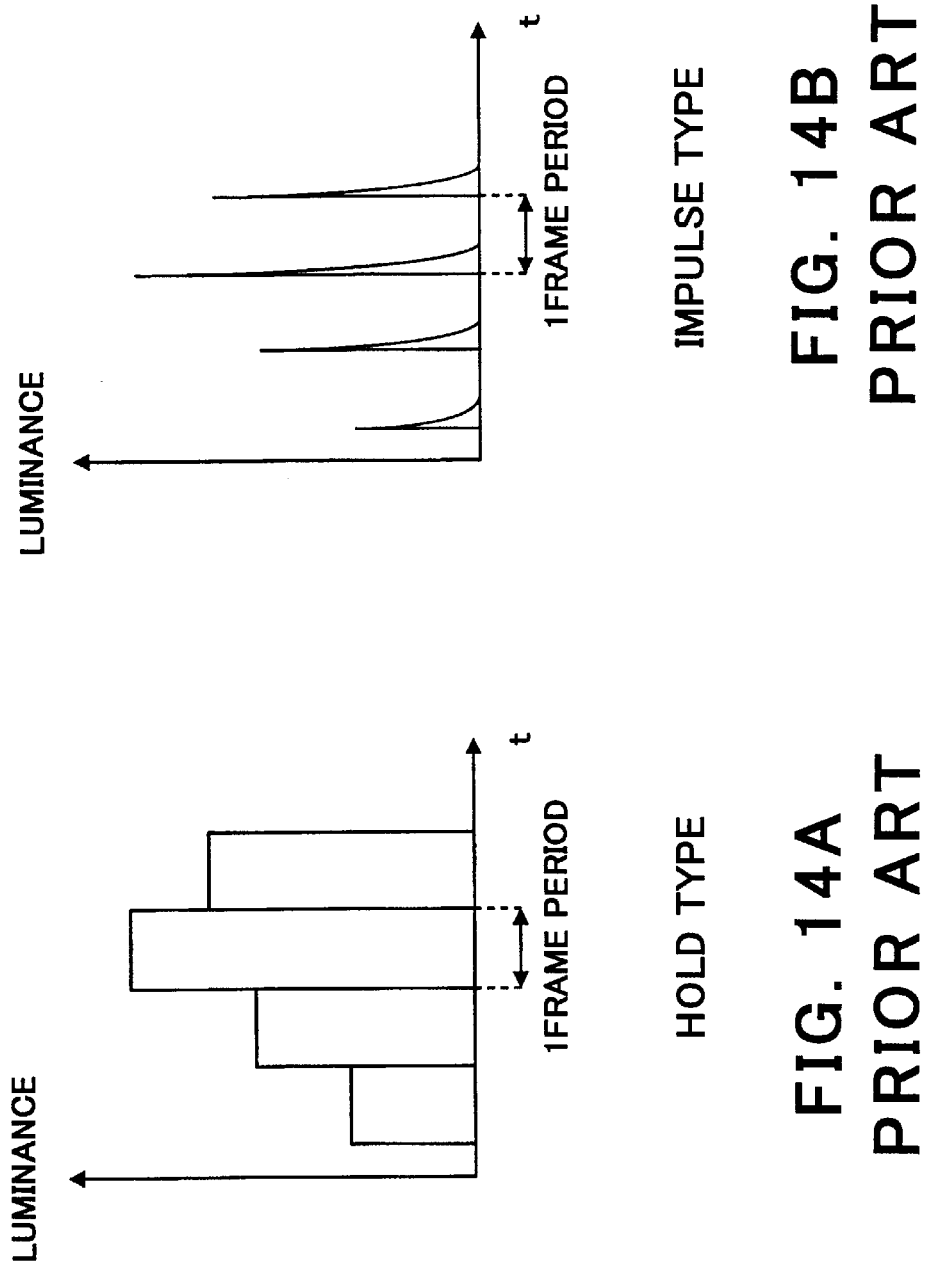

FIGS. 13A and 13B are explanation views showing display characteristics of the display device according to this embodiment in conjunction with the case where white patterns travel on a black background, in which FIG. 13A shows the displacement of the pattern and FIG. 13B shows a luminance distribution thereof. FIGS. 13A and 13B correspond to the case where the pixels at the edges of the pattern W are displayed by using the display signal corrected at the step S306 described with reference to FIG. 10.

The broken lines V1 to V8 represent the movement of the eyes of a viewer who are looking at a moving pattern W. The broken lines V1 and V2 as well as V5 and V6 correspond to a displacement of the viewer's eyes gazing at the pixel having the smallest value n of the pixels Pn that make up the pattern W. More specifically, the broken lines V1 and V5 correspond to the displacement of the viewer's eyes at the beginning of the black period Tb in one frame period T. The broken lines V2 and V6 correspond to the displacement of the viewer's eyes at the beginning of the video display period Ta in the same frame period.

On the other hand, the broken lines V3 and V4 as well as V7 and V8 correspond to a displacement of the viewer's eyes gazing at the pixel having the largest value n of the pixels Pn that make up the pattern W. More specifically, the broken line V3 corresponds to the displacement of the viewer's eyes at the beginning of the black period Tb in one frame period T. The broken lines V4 and V8 correspond to the displacement of the viewer's eyes at the beginning of the video display period Ta in the same frame period. The broken line V7 corresponds to the displacement of the viewer's eyes at the end of the video display period Ta in one frame period T.

As shown in FIG. 13B, the region left from the broken line V1 has the luminance value of zero (0). The luminance becomes higher at a constant ratio in the region defined between the broken lines V1 and V2. On the broken line V2, the value of the luminance is equal to that of the pattern W, i.e., B. This is because the luminance for the video display period Ta is corrected by using the above mentioned equation 2 at the step S306.

The luminance becomes higher in the region defined between the broken lines V2 and V5. On the broken line V5, the value of the luminance is equal to $B+B*(a/100)$, wherein a represents a proportion of the black period Tb in one frame period T. The reason why the luminance has such a value on the broken line V5 is described.

In FIG. 13A, for the pixel P1 in the n-th frame, the luminance for the video display period Ta is corrected by using the above mentioned equation 2. The luminance after the correction is recognized by the viewer as being similar to the luminance B of the pattern W only when he or she looks at the pixel during the video display period Ta. Therefore, the luminance on the broken line V2 has the value of B.

On the other hand, the luminance for the pixels P2 to P4 in the n-th frame is equal to the luminance B of the pattern W. This is the luminance that the viewer can recognize when he or she looks at the pixels for the duration corresponding to one frame period. Therefore, if the viewer looks at the pixel P1 only during the black period Tb, the luminance perceived by the viewer can be given as $B*\{Tb/(Ta+Tb)\}$, that is, $B*(a/100)$.

Accordingly, the luminance on the broken line V5 is the sum of the luminance B, obtained when only the viewer looks at the pixel during the video display period Ta and the above-mentioned luminance $B*(a/100)$, i.e., $B+B*(a/100)$.

After the luminance becomes high in the region defined by the broken lines V2 and V5, the luminance becomes lower at a constant ratio in the region defined between the broken lines V5 and V6. On the broken line V6, the value of the luminance is equal to B. The luminance B is kept in the region defined by the broken lines V6 and V7.

The luminance becomes higher at a constant ratio in the region defined between the broken lines V7 and V8. On the broken line V8, the value of the luminance is again equal to B+B. The luminance becomes lower at a constant ratio in the region defined between the broken lines V8 and V3. On the broken line V3, the value of the luminance is again equal to B. The luminance becomes lower in the region defined between the broken lines V3 and V4. On the broken line V4, the luminance has the value of zero (0).

For the purpose of comparison, FIGS. 8A and 8B are referred again in which the display characteristics of the display device according to the first embodiment are given. As compared with the case shown in FIG. 8B, the change in luminance exhibits a larger gradient at the edges of the pattern in FIG. 13B. Therefore, the blur of the video image at the edges thereof can be reduced. In addition, the region inside the edges has a higher luminance than the pattern, which results in emphasis of the edges and, consequently, further reduces the blur of the video images. As in the first embodiment, the present invention offers clear, better and bright display on the display device.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A display device comprising:
    a display unit on which a video image made up of a plurality of pixels is displayed;
    a driving unit for driving the display unit;
    a video signal memory unit for storing a video signal supplied from outside; and
    a control unit adapted to generate a display signal in accordance with the video signal stored on said video signal memory unit to control driving operation of said driving unit made on said display unit by using the display signal, the display signal being indicative of a video image to be displayed on said display unit for a given frame period, said control unit comprising:
        calculating means for calculating a value of luminance for a video image to be displayed for a first frame period and a value of luminance for a video image to be displayed for a second frame period subsequent to the first frame period, the values of luminance being calculated for each one of pixels in accordance with the video signal supplied from outside;
        comparing means for comparing the value of the luminance for the video image to be displayed for the first frame period and the value of the luminance for the video image to be displayed for the second frame period;
        determining means for determining, according to the comparison result, whether it is necessary to insert a black period into the first frame period to display a black image; and generating means for generating the display signal for the first frame period when said determining means determines that the black period is required, the display signal to be generated having the black period and a video display period for displaying a video image.

2. A display device as claimed in claim 1, wherein said generating means is configured to determine the order of the video display period and the black period.

3. A display device as claimed in claim 2, wherein said generating means is configured to generate the display signal such that the video display period precedes the black period, when the value of the luminance for the video image to be displayed for the second frame period is smaller than the value of the luminance for the video image to be displayed for the first frame period and, when a difference is equal to or larger than a predetermined value between the value of the luminance for the video image to be displayed for the first frame period and the value of the luminance for the video image to be displayed for the second frame period.

4. A display device as claimed in claim 3, further comprising a specifying unit for specifying the predetermined value such that the predetermined value falls within a range of luminance available for said display unit.

5. A display device as claimed in claim 2, wherein said generating means is configured to generate the display signal such that the black period precedes the video display period, when the value of the luminance for the video image to be displayed for the second frame period is larger than the value of the luminance for the video image to be displayed for the first frame period and, when a difference is equal to or larger than a predetermined value between the value of the luminance for the video image to be displayed for the first frame period and the value of the luminance for the video image to be displayed for the second frame period.

6. A display device as claimed in claim 5, further comprising a specifying unit for specifying the predetermined value such that the predetermined value falls within a range of luminance available for said display unit.

7. A display device as claimed in claim 1, wherein said video signal memory unit and said control unit each comprises a memory area capable of storing the video signal corresponding to one frame.

8. A display device as claimed in claim 1, further comprising a specifying unit for specifying a time length of the black period.

9. A display device as claimed in claim 1, wherein the video signal supplied from outside represents a gray scale of the video image to be displayed on said display unit, said display device further comprising:
correspondence information memory unit for storing correspondence information indicative of a correspondence between the gray scale and the luminance;
said calculating means being configured to calculate the value of the luminance for the video image to be displayed for the first frame period and the value of the luminance for the video image to be displayed for the second frame period in accordance with the gray scale represented by the video signal supplied from outside and the correspondence information stored on said correspondence information memory unit.

10. A display device as claimed in claim 1, wherein said control unit further comprises correcting means for correcting the display signal generated by said generating means such that a value of luminance for a video image to be displayed during the video display period is higher than the value of the luminance for the video image to be displayed for the first frame period.

11. A display device as claimed in claim 10, wherein the video signal supplied from outside represents a gray scale of the video image to be displayed on said display unit, said display device further comprising:
correspondence information memory unit for storing correspondence information indicative of a correspondence between the gray scale and the luminance;
said correcting means being configured to convert a value of luminance for a video image to be displayed during the video display period into a gray scale of the video image in accordance with the correspondence information stored on said correspondence information memory unit.

12. A display device as claimed in claim 11, wherein said correcting means is configured to convert the value of the luminance for the video image to be displayed during the video display period into a gray scale corresponding to the value of the luminance that is the closest to the value of the luminance for the video image to be displayed during the video display period out of the values of luminance represented by the correspondence information, when the value of the luminance for the video image to be displayed during the video display period is not represented by the correspondence information.

13. A display device as claimed in claim 11, wherein said correcting means is configured to convert the value of the luminance for the video image to be displayed during the video display period into a gray scale corresponding to the largest value of the luminance but not larger than the value of the luminance for the video image to be displayed during the video display period out of the values of luminance represented by the correspondence information, when the value of the luminance for the video image to be displayed during the video display period is not represented by the correspondence information.

14. A display device as claimed in claim 11, wherein said correcting means is configured to convert the value of the luminance for the video image to be displayed during the video display period into a gray scale corresponding to the smallest value of the luminance but larger than the value of the luminance for the video image to be displayed during the video display period out of the values of luminance represented by the correspondence information, when the value of the luminance for the video image to be displayed during the video display period is not represented by the correspondence information.

15. A method for driving a display device having a display unit on which a video image made up of a plurality of pixels is displayed, said method comprising the steps of:

calculating a value of luminance for a video image to be displayed for a first frame period and a value of luminance for a video image to be displayed for a second frame period subsequent to the first frame period, the values of luminance being calculated for each one of pixels in accordance with the video signal supplied from outside;

comparing the value of the luminance for the video image to be displayed for the first frame period and the value of the luminance for the video image to be displayed for the second frame period;

determining, according to the comparison result, whether it is necessary to insert a black period into the first frame period to display a black image; and generating the display signal when it is determined that the black period is required, the display signal representing the video image that should be displayed on the display unit, the display signal having the black period and a video display period for displaying a video image; and driving the display unit to display the video image for the first frame period by using the display signal generated.

16. A method as claimed in claim 15, wherein said step of generating the display signal determines the order of the video display period and the black period.

17. A method as claimed in claim 16, wherein said step of generating the display signal generates the display signal such that the video display period precedes the black period, when the value of the luminance for the video image to be displayed for the second frame period is smaller than the value of the luminance for the video image to be displayed for the first frame period and, when a difference is equal to or larger than a predetermined value between the value of the luminance for the video image to be displayed for the first frame period and the value of the luminance for the video image to be displayed for the second frame period.

18. A method as claimed in claim 16, wherein said step of generating the display signal generates the display signal such that the black period precedes the video display period, when the value of the luminance for the video image to be displayed for the second frame period is larger than the value of the luminance for the video image to be displayed for the first frame period and, when a difference is equal to or larger than a predetermined value between the value of the luminance for the video image to be displayed for the first frame period and the value of the luminance for the video image to be displayed for the second frame period.

19. A method as claimed in claim 15, wherein the video signal supplied from outside represents a gray scale of the video image to be displayed on the display unit, and wherein said calculation step calculates the value of the luminance for the video image to be displayed for the first frame period and the value of the luminance for the video image to be displayed for the second frame period in accordance with correspondence information indicative of a correspondence between the gray scale and the luminance and the gray scale represented by the video signal supplied from outside.

20. A method as claimed in claim 15, further comprising the step of correcting the display signal generated such that a value of luminance for a video image to be displayed during the video display period is higher than the value of the luminance for the video image to be displayed for the first frame period.

21. A method as claimed in claim 20, wherein the video signal supplied from outside represents a gray scale of the video image to be displayed on the display unit, and wherein said step of correcting the display signal converts a value of luminance for a video image to be displayed during the video display period into a gray scale of the video image in accordance with correspondence information indicative of a correspondence between the gray scale and the luminance.

22. A method as claimed in claim 21, wherein said step of correcting the display signal converts the value of the luminance for the video image to be displayed during the video display period into a gray scale corresponding to the largest value of the luminance but not larger than the value of the luminance for the video image to be displayed during the video display period out of the values of luminance represented by the correspondence information, when the value of the luminance for the video image to be displayed during the video display period is not represented by the correspondence information.

23. A method as claimed in claim 21, wherein said step of correcting the display signal converts the value of the luminance for the video image to be displayed during the video display period into a gray scale corresponding to the smallest value of the luminance but larger than the value of the luminance for the video image to be displayed during the video display period out of the values of luminance represented by the correspondence information, when the value of the luminance for the video image to be displayed during the video display period is not represented by the correspondence information.

24. A method as claimed in claim 21, wherein said step of correcting the display signal converts the value of the luminance for the video image to be displayed during the video display period into a gray scale corresponding to the value of the luminance that is the closest to the value of the luminance for the video image to be displayed during the video display period out of the values of luminance represented by in the correspondence information, when the value of the luminance for the video image to be displayed during the video display period is not represented by the correspondence information.

* * * * *